United States Patent [19]

Shambaugh

[11] Patent Number: 5,231,463
[45] Date of Patent: Jul. 27, 1993

[54] METHOD FOR ON-LINE FIBER FLOW MEASUREMENT

[75] Inventor: Robert L. Shambaugh, Norman, Okla.

[73] Assignee: The Board of Regents of the University of Oklahoma, Norman, Okla.

[21] Appl. No.: 795,371

[22] Filed: Nov. 20, 1991

[51] Int. Cl.$^5$ ............................................. G01N 21/53
[52] U.S. Cl. ...................................... 356/336; 356/342
[58] Field of Search ...................... 356/28.5, 336, 338, 356/342, 384, 385

[56] References Cited

U.S. PATENT DOCUMENTS 3,978,185 8/1976 Buntin et al. .
4,622,259 11/1986 McAmish et al. .
4,820,577 4/1989 Morman et al. .

OTHER PUBLICATIONS

Sato et al. "Laser Doppler particle measuring system using nonsinusoidal forced vibration and bispectral analysis".
Article Entitled, "A Macroscopic View of the Meltblowing Process for Producing Microfibers", Ind. Eng. Chem. Res., 27(12):2363-2372 (1988). Robert L. Shambaugh (no month).
Article Entitled, "The Manufacture of Continuous Polymeric Filaments by the Melt-Blowing Process", Polymer Engineering & Science, 30(19):1237-1251 (Mid-Oct. 1990). J. C. Kayser and R. Shambaugh.
Article Entitled, "Determination of the Autocorrelation Function of Woven Fabrics Using Laser Speckle", Textile Res. J. 50(4):238-244 (Apr. 1990). E. Toba.
Article Entitled, "A Comparative Study of Three Methods Used for Measuring Fibre Diameter," Indian J. Text. Res. I. M. Fouda, T. El-Dessouki, J. El-Farhaty vol. 13, Mar. 1988 pp. 11-16.
Article Entitled, "Effective Particle Size Range in Laser-Doppler Anemonetry," Experiments in Fluids 5, pp. 305-314 (1987). (no month) F. Durst and B. Ruck.
Article Entitled, "Laser Doppler Measurements in Two-Phase Flows," Proc. LDA-Symp., Copenhagen, pp. 403-429 (1975) (no month) F. Durst and M. Zare.
Article Entitled, "Anwendung der Laser-Doppler-Anemometrie am Beispiel des Oe-Friktionsspinnens (Application of Laser-Doppler-Anemometry as shown in the Example of OE Friction Spinning)", Textil Parxis Int'l. 42:248-250 (Mar. 1987) K. J. Brockmanns, J. Bruske, G. Texlaff and T. T. Phoa.
Article Entitled, "Einflud der Faserstromungsverhaltnisse auf die Garneigenschaften Beim Offenendrotorspinnen (Influence of Fiber Flow Conditions on Thread Properties in Open-End Rotor Spinning)". Textil Praxis International Jan. 1988 pp. 15-17.
Article Entitled, "Applications of Laswer Technology for the Textile Industry", Textiltechnik 32:117-123 (1982), (no month) D. Pollack and G. Wiedemann.
Article Entitled, "Application of Laser Homodyne Spectrometer to Particle Size Measurements," Ph.D. Thesis, Case Western Reserve University, Nov. 1967, J. W. Dunning, Jr.
Article Entitled, "Measurement of Particle Size, Number Density, and Velocity Using a Laser Interferometer," Appl. Opt. 11(11):2603-2612 (Nov. 1972), W. M. Farmer.

(List continued on next page.)

Primary Examiner—Richard A. Rosenberger
Attorney, Agent, or Firm—Dunlap, Codding & Lee

[57] ABSTRACT

A method for using laser Doppler velocimetry to determine the mass flux (mass per area per time) of a polymer fiber stream without interfering with the flow of the fiber stream wherein a factor is determined for converting laser data rate information into stream flow mass flux values and to determine the diameter of a filament by measuring filament velocity without interfering with the flow of the filament.

34 Claims, 18 Drawing Sheets

OTHER PUBLICATIONS

Article Entitled, "Noncontact Filament Diameter Measuring Technique", Instrument Society of America 757 (pp. 1-7) (1974), (no month) S. Holly and S. L. Chao.

Article Entitled, "Laser Scanner Inspektionsysteme fur Vliesstoffe (Laser Scanner Inspection System for Non-Wovens)", Chemiefasern/Textilindustrie 37:708-709 (Aug. 1987), K. S. Munchen.

Article Entitled, "Neue Spinnverfahren" (New Spinning Techniques) Faserverabeitung (Fiber Processing), Textilforschung, 35:16-20 (1987). (no month).

Article Entitled, "Nonwoven Textile Fabrics," Enc. Chem. Tech., Wiley Interscience, 16:72-124 (1978), (no month) K. Porter.

Article Entitled, "The Sizing of Large Droplets by Laser Anemometry," J. Phys. L:Sci. Instrum., 11:639-642 (1978), (no month) G. Wiley.

Article Entitled, "Properties of Laser Doppler Signals and Their Exploitation for Particle Size Measurements," Proc. LDA-Symp., Copenhagen; Skovlund, Denmark, pp. 457-477 (1975), (no month) Durst; Eliasson.

Article Entitled, "Observation of Large Particles with a Laser Interferometers," Appl. Opt. 12(3):610-622 (Mar. 1974), W. M. Farmer.

Article Entitled, "On-Line Inspection for Nonwoven Fabrics," Twelfth Technical Symposium, Assocation of Nonwoven Fabrics Industry, pp. 249-264 (1984), (no month) W. E. Wolf.

Article Entitled, New LDV Technology, Published by TSI Incorp (no date).

Article Entitled, "Signal Processors", 4 pages (no date).

Article Entitled, "Principles and Practice of Laser-Doppler Anemometry". 1981, F. Durst, H. Melling and J. H. Whitelaw. 2nd. Ed. Academic Press (no month).

Article Entitled, "Laser and Their Applications in Polymers, Fibre Science and Textile Technology", ATIR Technical Digest, No. 1, pp. 10-20 (Mar. 1982), A. K. Kulshreshtha.

Article Entitled, "Optoelectronischer Sensor zur Beruhrungslosen Geschwindigkeitsmessung an Textilen Oberflachen" (Optoelectronic Sensor for the Non-Contact Measurement of Velocity of Textile Surfaces), Textile Praxis International 43:640-643, (Jun. 1988). W. Ringens, F. Schmitz, H. Brunger, E. Schollmeyer.

Article Entitled, "Application of Backward Light-Scattering Interference Patterns for Calculating the Refractive Indices of some Polymeric Fibres", Indian Journal of Textile Res. vol. 12 Jun. 1987 pp. 100-102.

Article Entitle, "Laser-Doppler Anemometrie: Alternative Stromungsmebtechnik bei der Optimierrung Neuer Spinnverfahren", Laser-Doppler Anemometry: Alternative Techniques for Measuring the Current with the Optimization of the New Spin Method), Chemiefasern/Textilindustrie, 37./89:829-832, W. Bauer, (Sep. 1987).

Article Entitled, "Production of Polyethylene Fibers and their Optical Properties and Radial Differences in Orientation," Text Res. J. 50:592-600 (Oct. 1990), A. A. Hamya, I. M. Fouda, et al.

Article Entitled, "Refractive Index and Diameter Measurements of Unclad Optical Fibers," J. Opt. Soc. Amer., 64(3):280-284, (Mar. 1974), H. M. Presby.

Article Entitled, "Calculating Fiber Index of Refraction from Laser Back-Scattering Data," Text. Res. J., 52:481-482, (Jul. 1982), J. M. Wilkes.

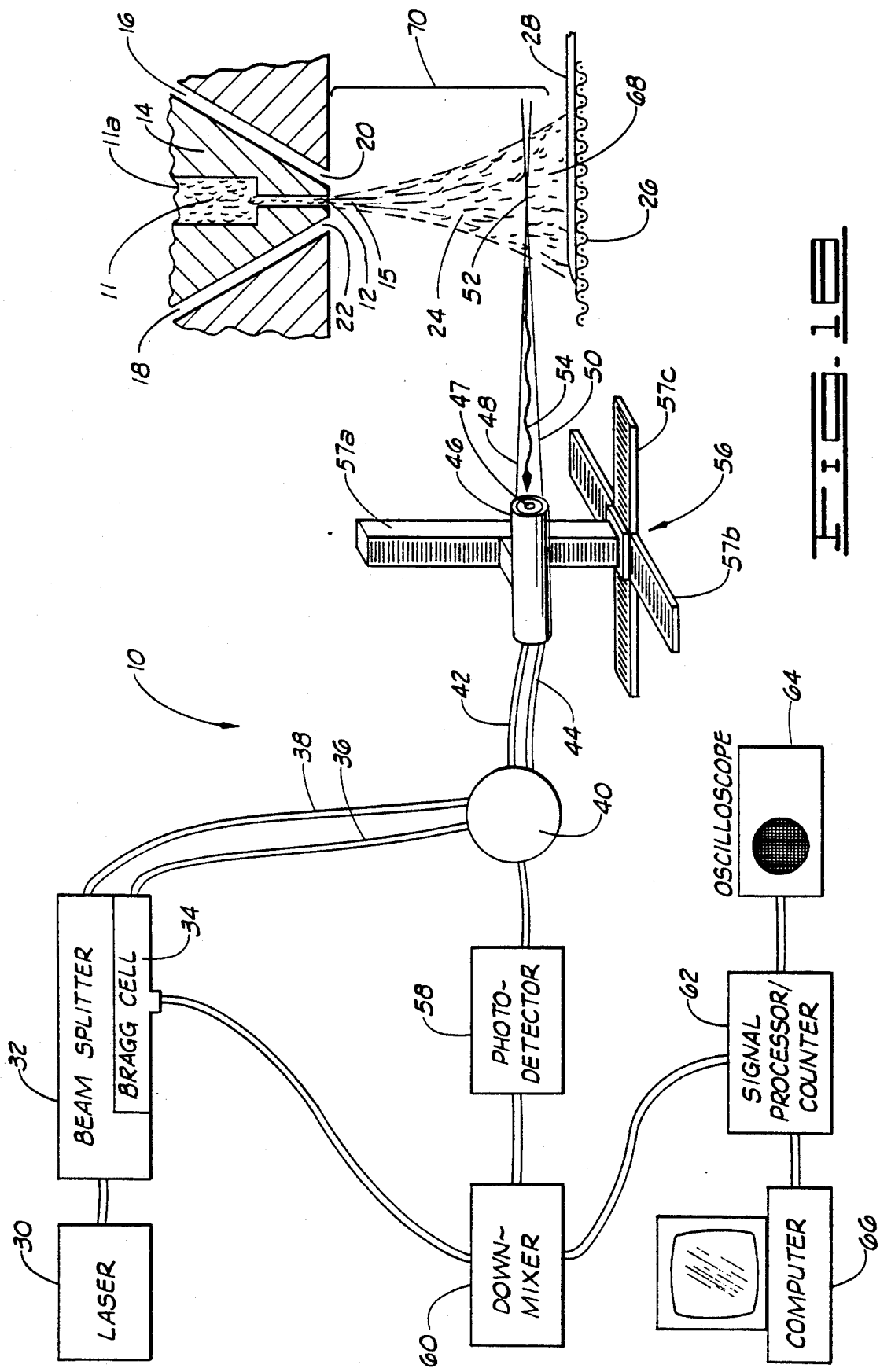

METHOD FOR ON-LINE FIBER FLOW MEASUREMENT

BACKGROUND OF THE INVENTION

1. Field of the Invention

The present invention relates to the non-invasive, on-line measurement of fiber flow and other fiber/mat properties in various fiber handling processes such as melt spinning, melt blowing, spunbonding, air laydown and wet laydown. More particularly, but not by limitation, the present invention relates to the use of laser Doppler velocimetry to measure the mass flux (defined as mass per area per time) of fibers, or filament velocity, in the fiber stream of a melt blowing apparatus.

2. Brief Description of the Prior Art

Since the construction of the first laser in 1960, the use of lasers in science, industry, and commerce has steadily risen. The use of lasers in the fiber industry is no exception. For example, a single laser beam, when shined upon a fiber, will produce a forward scatter pattern that is dependent on the fiber diameter. As a method of off-line, post-production fiber size measurement, use of this forward scatter pattern is more accurate and much faster than obtaining diameters by optical microscopy or scanning electron microscopy as shown by I. M. Fouda et al. in the article, "A Comparative Study of Three Methods for Measuring Fiber Diameter", *Indian J. of Text. Tech.*, Vol. 13, pp. 11–16, 1988.

This forward scatter technique can also be used to measure the diameter of moving filaments. Thus, for example, the procedure can be used to monitor the diameter of a fiber during conventional melt spinning as indicated by A. A. Hamza et al., in "Production of Polyethylene Fibers and Their Optical Properties and Radial Differences in Orientation", *Text. Res. J.*, Vol. 50, pp. 592–600, 1980. In addition, the back-scattered radiation from a moving (or stationary) filament can be used to measure refractive index as illustrated by H. M. Presby in "Refractive Index and Diameter Measurements of Unclad Optical Fibers", *J. Opt. Soc. Amer.*, Vol. 64, pp. 280–284, 1974, and by J. M. Wilkes in "Calculating Fiber Index of Refraction from Laser Back-Scattering Data", *Text. Res. J.*, Vol. 52, pp. 481–482, 1982. Besides the analysis of single filaments, single beam lasers can also be used to examine defects in yarns and fabrics. The randomness/texture of the surfaces causes the formation of a diffraction (speckle) pattern from which information on defects can be determined as shown by E. Toba in the article, "Determination of the Autocorrelation Function of Woven Fabrics Using Laser Speckles", *Text. Res. J.*, Vol. 50, pp. 238–244, 1980. W. E. Wolf in the article, "On-Line Inspection for Nonwoven Fabrics", 12th *Technical Symposium*, Ass'n of Nonwoven Fabrics Industry, pp. 249–264, 1984, described a method for using lasers during post-production examination of nonwoven fabrics.

Another laser configuration that has found use in fiber science is laser Doppler velocimetry, or LDV. LDV is commonly used to measure fluid velocities by examining the Doppler shift in the laser light scattered by small particles moving with the fluid. In the usual dual-beam LDV system, two laser beams are focused so as to intersect and form a small measuring volume, or mv. Particles which pass through this mv produce Doppler bursts of scattered light. An LDV system is noninvasive and can measure velocities in the range of 10 μm/s to 1 km/s.

In the textile area, LDV has been used for the measurement of the velocity of textile surfaces by W. Ringens et al., as indicated in the article "Optoelectronic Sensor for Motionless Velocity Measurement of Textile Surfaces", *Textil Praxis International*, Vol. 43, pp. 640–643, 1988. LDV has also been used for the measurement of fiber velocities in a fiber conduit during open end friction spinning by K. J. Brockmanns et al., in "Application of Laser Doppler Anenometry: Open-end Friction Spinning of Yarn", *Textil Praxis International*, Vol. 42, pp. 248–250, 1987, and by W. Bauer et al., in "Fiber Flow and Its Effects on the Characteristics of Open-end Spun Yarn", *Textil Praxis International*, Vol. 44, pp. 15–17, 1989. Lasers have also been used to measure the diameter of filaments and fiber bundles in-process by S. Holly and S. L. Chao in the article, "Noncontact Filament Diameter Measuring Technique", *Instrument Soc. of America*, 757 (pp. 1–7) (1974). Holly and Chao did not measure filament velocity to determine filament diameter but rather determined filament diameter by adjusting the interference fringe spacing to a minimum.

In the common application of LDV to a single-phase system (e.g., air or water), the fluid must often be artificially seeded with fine particles (e.g., oil droplets or a fine powder) in order for the laser light to be scattered and measured. The seed concentration is low and the seed sizes are small: 0.5 to 5 micron diameters are typical. A more complex problem is the application of LDV to two-phase flows such as air bubbles in water or large liquid drops in air as studied by F. Durst and M. Zare in "Laser Doppler Measurements in Two-Phase Flows", pp. 403–429, *Proceedings of the LDA-Symposium*, Copenhagen; Skovlunde, Denmark, 1975. In these two-phase flows, the size and concentration of the dispersed phase are much greater than the seed concentration in a single-phase system (of course, a seeded system is actually a two-phase system). Surfaces can be so large, in fact, that the mv intersection of the laser beams cannot illuminate the entire surface at one time.

For the particular case of spherical particles of one phase dispersed in a second phase, exact mathematical treatments are possible for relating the Doppler signals to the particle sizes. These treatments are discussed by W. M. Farmer in "Measurement of Particle Size, Number Density, and Velocity Using a Laser Interferometer", *Applied Optics*, Vol. 11, pp. 2603–2612, 1972; and by F. Durst and B. Ruck in, "Effective Particle Size Range in Laser Doppler Anemometry", *Experiments in Fluids*, Vol. 5, pp. 305–314, 1987. For cylindrically-shaped objects, such as fibers, the expected signals can be much more complex. If the cylinder moves with its major axis perpendicular to the plane of the crossing beams, the expected signals are very similar to the signals from a sphere. However, for a cylinder (i.e., fiber) with random orientation in space, prediction of the expected signals is mathematically intractable. Because of this, LDV has not previously been successfully applied to fiber technologies exhibiting random fiber orientations.

BRIEF DESCRIPTION OF THE DRAWINGS

FIG. 18 is a schematic diagram including a cross-sectional view of a melt blowing die and a laser monitoring apparatus.

BRIEF DESCRIPTION OF THE INVENTION

Figure 1:
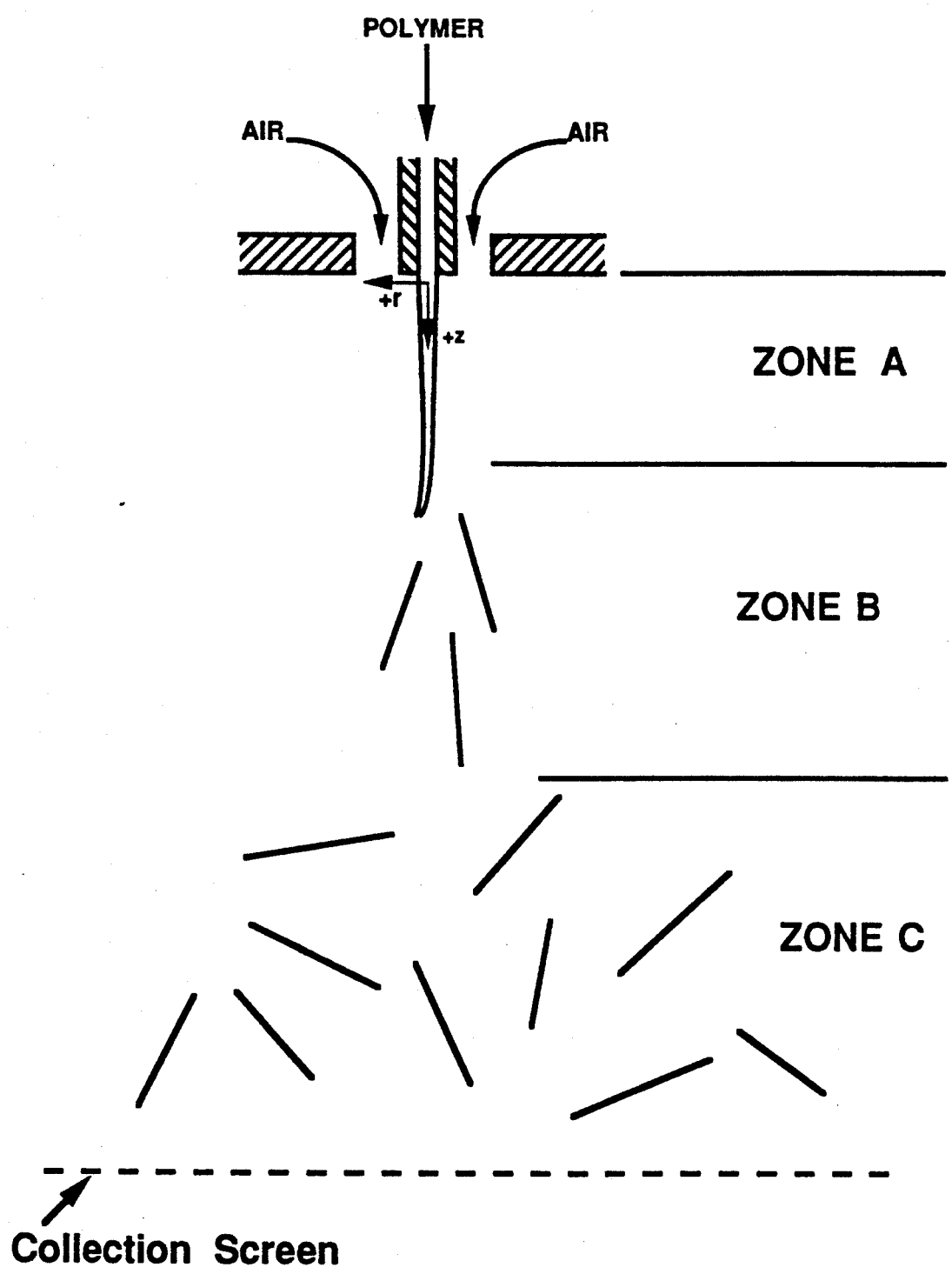
FIG. 1 is a diagram illustrating the zones of orientation within a melt blown fiber stream.

There is currently no satisfactory method available for measuring the mass flux (mass per area per time) of fibers prior to their collection as a mat on the collection screen. The present invention provides a method for the non-invasive, on-line measurement of the flow of fibers from a fiber producing/handling/ processing apparatus at the point of the fiber stream. In a preferred embodiment of the invention, the technology used to analyze the characteristics of the fiber stream is laser Doppler velocimetry (LDV).

Prior to this invention, laser Doppler velocimetric techniques had not been applied to the measurement of fibers produced during such fiber handling processes as melt blowing due to the complexities and mathematical intractibilities caused by the random orientation of the fibers in the fiber stream space. Described herein is a method which utilizes unexpected research results and a newly derived mathematical relationship to interpret the results obtained from the laser Doppler velocimetric analysis of fiber streams to determine the mass flux of the fibers within the streams.

A key element of the method of the present invention depends upon determining the mass flux (mass per area per time) of fibers in a fiber stream by using a laser beam to measure the movement of fibers through the stream by the detection of repeated optical "bursts" which occur when fibers passing through the laser beam effect the scattering of the laser light.

To understand the application of LDV technology to a specific fiber handling technology, research into LDV's use in melt blowing will be discussed and demonstrated further. It will be understood that even though the discussion below relates specifically to polymer fiber handling, the technology described herein could also relate to the application of LDV to other technologies involving metal, glass, ceramics, minerals, including silica fibers, natural organic materials including wood, paper, cotton and cellulose, or combinations thereof.

Nomenclature

As used herein, the following symbols and subscripts have the following meanings:

$D(r,z)$ = data rate function, $s^{-1}$.
$k$ = conversion factor, $kg/m^2$.
$\dot{m}$ = mass of fibers per time, $kg/s$.
$r$ = cylindrical coordinate, m.
$T_8$ = time elapsed during 8 cycles of a Doppler burst.
$v$ = velocity, m/s.
$x$ = Cartesian coordinate, m.
$y$ = Cartesian coordinate, m.
$y'$ = fiber-measuring volume crossover, mm.
$z$ = axial coordinate, m.
$\alpha$ = fiber angle in calibration wheel coordinates (radians).
$\beta$ = probe angle in calibration wheel coordinates (radians).
$\theta$ = cylindrical or spherical coordinate (radians).
$\pi = 3.14159 \ldots$
$\delta$ = fiber diameter, $\mu m$.
$r$(subscript) = cylindrical coordinate in the radial direction.
$z$(subscript) = rectangular, or cylindrical coordinate in the axial direction.
$a$(subscript) = air.
$o$(subscript) = origin.
$p$(subscript) = polymer.
$g$(subscript) = gas.

Melt Blowing and LDV

Melt blowing is one of many fiber handling processes employed to produce nonwoven mats of fiber. In the melt blowing process, a fine polymeric stream is extruded into a high velocity gas stream. The force of the gas rapidly attenuates the polymer into filaments of very small diameters (see FIG. 1 for a diagram of the process). Melt blown fibers typically range from 30 microns in diameter to filaments as fine as 0.1 micron in diameter. This extreme fineness gives melt blown fibers advantages in uses such as insulation, absorbent material, and filters. An overview of the melt blowing process is given by R. L. Shambaugh in "A Macroscopic View of the Melt Blowing Process for Producing Microfibers", *Ind. Eng. Chem. Res.*, Vol. 27, pp. 2363–2372 (1988), which specifically is hereby incorporated herein by reference.

During the production of nonwoven fiber mats, fibers are directed to some collection screen or device from a series of jets or orifices. During this process inhomogeneities (i.e., inconsistencies) may occur in the fiber stream flow, thus resulting in areas in the mats which are relatively fiber rich or fiber poor.

Currently, quality of the fiber mats is generally assessed off-line, after production has already occurred. On-line monitoring of the mass flux of the fiber stream could be conducted by placing a small sampling cup or device in between the fiber orifices and collection screen for a fixed period of time to measure the mass accumulated. However, this invasive method would be undesirable because it would interrupt the continuous flow of fibers to the collection screen and it would result in adverse effects to the finished product, the fiber mat.

LDV, on the other hand, offers the potential of providing a non-invasive, thus more feasible and desirable, method which could quickly and easily assess the mass flux without interrupting the continuous flow of fibers to the fiber mat.

In order to evaluate the potential use of laser Doppler velocimetry (LDV) as a non-invasive method of melt blowing analysis, a program of experimental research was conducted. For an array of positions below the melt-blowing die, LDV measurements were made on the fiber velocities in three-space. This information allowed quantification of the existence of an expanding "cone" of fibers below the melt blowing die.

Three zones of fiber motion at the exit of a melt blowing die can be defined, as illustrated in FIG. 1. Zone A is located adjacent to the die exit. In zone A, the fibers are predominantly oriented in the z (vertical) direction, and fiber motion is also predominantly in the z direction.

In zone C the fibers are nearly randomly oriented in space, and fiber motion occurs in all directions. However, there is a net velocity in the z direction, since fibers continue to build on the collection screen. Also, since the fiber cone continues to expand, there is a net velocity in the r direction outward from the center of the cone.

Zone B is a transition zone between zone A and zone C. Some arbitrary, quantitative measure of randomness of fiber orientation can be used to define the boundary between zone A and zone B and the boundary between zone B and zone C.

Melt blowing *zones* should not be confused with the melt blowing *regions* defined by Shambaugh (1988), referred to before. In region I, the mass loading (kg air/kg polymer) is low, and the fibers are continuous and filamentous. As mass loading is further increased, region II is entered, fibers are discontinuous, and undesirable polymer lumps, or "shots", are present. Finally, as mass loading is increased further, region III is entered. In region III, large and undesirable shots are not present, and the fibers are very fine.

For a given set of operating parameters, a melt blowing system will be in only one region of operation. However, the three zones of melt blowing exist for each region of operation. Of course, the spatial location of the zones is a function of the region of operation. For example, the transition from zone A to zone B might occur much closer to the die for operation in region III versus operation in region I.

Theoretical and experimental work described herein demonstrates a methodology to enable LDV signals to be interpreted as a means for measuring fiber size (diameter).

EXPERIMENTAL METHODOLOGY

Melt Blowing Equipment and Polymers

The melt blowing equipment used in these experiments was the same as that described in previous work (which did not involve use of lasers) by J. C. Kayser and R. L. Shambaugh, "The Manufacture of Continuous Polymeric Filaments by the Melt Blowing Process", *Polym. Eng. Sci.*, Vol. 30, 1990, pp. 1237–1251, which specifically is hereby incorporated herein by reference. The polymer capillary used had an inside diameter of 0.533 mm, an outside diameter of 0.826 mm, and a length of 15.9 mm. The orifice plate had a straight bore (S-type), a diameter of 1.656 mm, and a length-to-diameter ratio of 1.92.

Except where noted, the polymer used was 54 MFR (melt flow rate) Fina Dypro* polypropylene with an $M_n$ of 40,700 and an $M_w$ of 157,000. Small amounts of Dow Aspun* polyethylene and Kodak Kodapak* 9899U polyester were also used.

Laser Doppler Velocimeter

Figure 2:
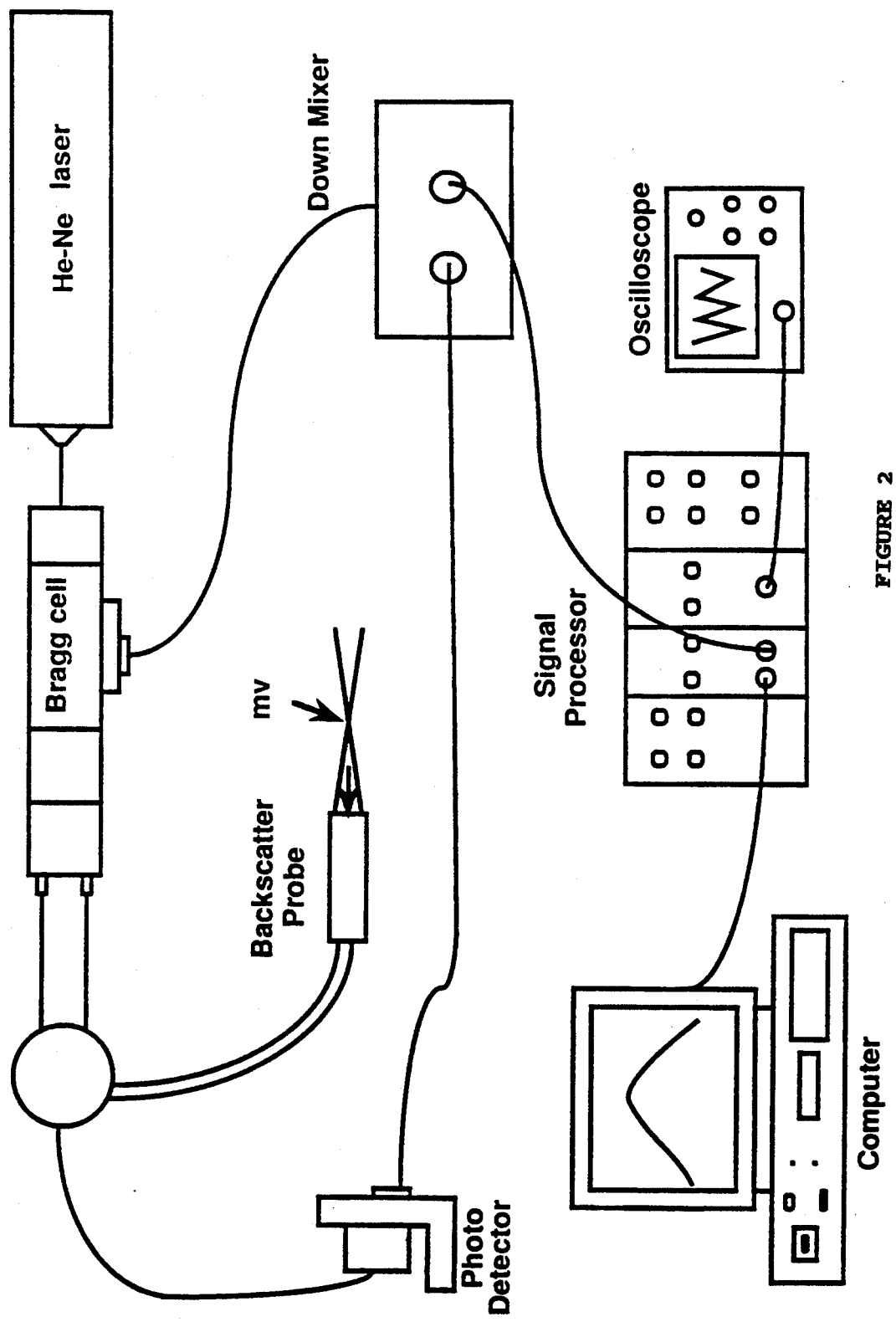
FIG. 2 is a schematic diagram of the overall equipment setup for laser Doppler velocimetry.

In the experiments a one-dimensional, frequency shift, fiber optic LDV system was used. The bulk of this system (diagramatically illustrated in FIG. 2) was supplied by TSI Incorporated. The laser was a 15 milliwatt He-Ne laser built by Spectra Physics. A Bragg cell provided frequency shifting for measuring flow reversals. The measuring volume (mv) was produced by a backscatter probe that was at the end of a 10 meter long fiber optic cable. This probe and cable system kept the LDV equipment remote from the hazards of the melt blowing equipment. The small, lightweight probe was 14 mm in diameter, 100 mm long, and had a working distance of 60 mm.

A TSI data analysis system and FIND software package (FIND is the Flow Information Display package which is part of the TSI integrated LDV system) were used to acquire, analyze, and display data on a 80286-based personal computer. A Tektronix oscilloscope (Model No. 2445B) was used to observe the Doppler bursts. The laser probe was mounted on a commercial positioning assembly (a Velmex 3-D traverse system) which was secured on top of a steel support stand. The Velmex unit permitted x, y, and z motions in 0.001 inch increments.

The signal processor was of the counter type (TSI model 1990C-1). This processor type was selected because the concentration of fibers is a low seeding condition. Also, this counter type gives more details on the flow than any other type of signal processor. The resolution of the 1990C-1 counter is nanosecond.

Figure 3:
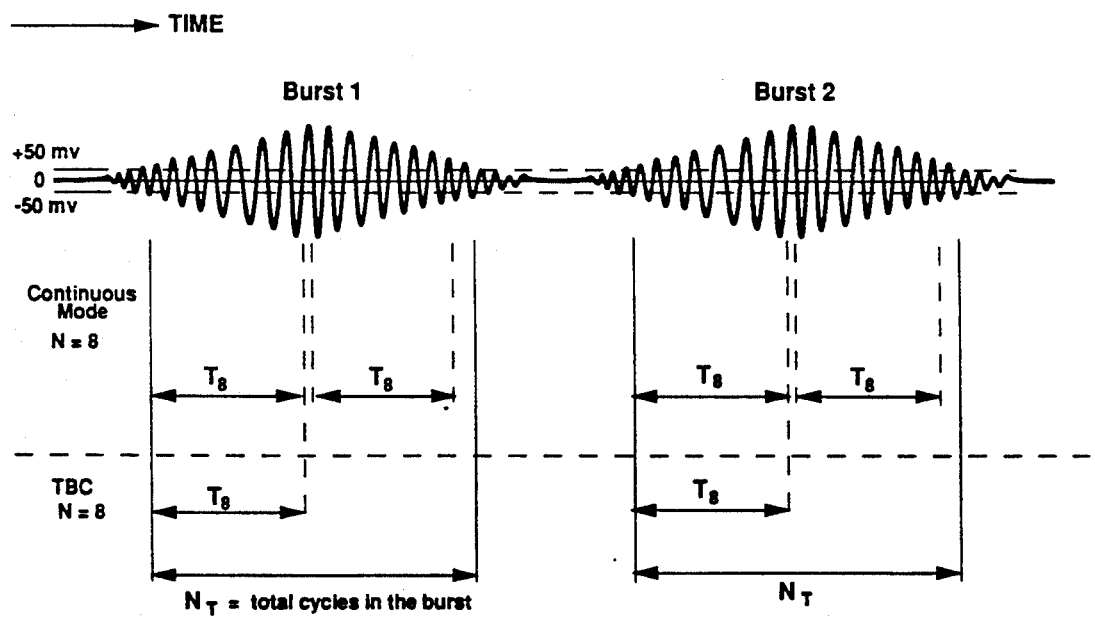
FIG. 3 is a diagram illustrating two Doppler bursts as they would appear on an oscilloscope screen.

Typical Doppler bursts that would occur from the sequential passage of two small particles through the measuring volume are shown in FIG. 3. FIG. 3 illustrates typical LDV bursts and a comparison of modes of operation for the signal counter where $T_8$ is the time required for 8 cycles to occur. In order to measure properly the velocity and number of particles, the settings on the LDV equipment must be carefully established. The primary settings were as follows:

(1) low and high filters. These settings eliminate high and low frequency noise. The filters should be set to bracket the expected signal frequencies.

(2) mode. In this work the continuous mode and the total burst count (TBC) mode were used (refer to FIG. 3). In the continuous mode, the timer begins a measurement each time the selected number of cycles is satisfied. Therefore, there may be more than one measurement per burst if the selected number of cycles is smaller than the number of cycles remaining in the burst. When the remaining number of cycles is less than the specified cycles/burst, the timer is reset to get ready for the next LDV burst. In the TBC mode, the timer makes only one measurement for the first N cycles of the entire burst. Also, in TBC mode the total number of cycles in the burst are counted.

(3) N=number of cycles. The N switch on the input conditioner panel has a range of $2^1$ to $2^7$. The switch allows the setting of the minimum number of valid cycles (cycles that have amplitudes greater than +50 mV) in a burst such that the burst is considered valid for measurement. FIG. 3 illustrates the situation where N=8.

(4) gain. The gain control amplifies the incoming Doppler signal into the range of the burst detector. Ideally, the gain control is set as high as possible, as long as the noise level does not exceed +50 mV. Also the signal should not be amplified beyond the saturation voltage (+1.5 V) level or waveform distortion will result.

(5) timer comparison. The objective of the timer comparison is to eliminate or to minimize noise contributions by checking the repeatability of the time for each cycle within a burst.

(6) frequency shift. The frequency shift system uses a Bragg cell to shift the frequency of one laser beam up to 40 MHz relative to the other beam. Frequency shifting eliminates directional ambiguity and thus permits the measurement of flow reversals.

(7) number of samples. This value determines the number of measurements that the LDV system collects during each acquisition cycle. After each cycle, the system displays mean velocity and standard deviation for the cycle.

Calibration Wheel

Because of the constraints on fiber motion in zone A (motion is essentially vertical), the LDV signals produced for zone A measurements are relatively easy to interpret. Such is not the case for zone C where the random orientation and variability in diameter of the fibers has made interpretation of an LDV signal, prior to the invention described herein, a virtually intractable problem.

Because of this complexity, an empirical approach to the problem was developed wherein correlations were developed to predict the LDV signal based on the fiber orientation and diameter. (Measurements of zone B can be considered a combination of signals of the zone C type and the zone A type).

Figure 4:
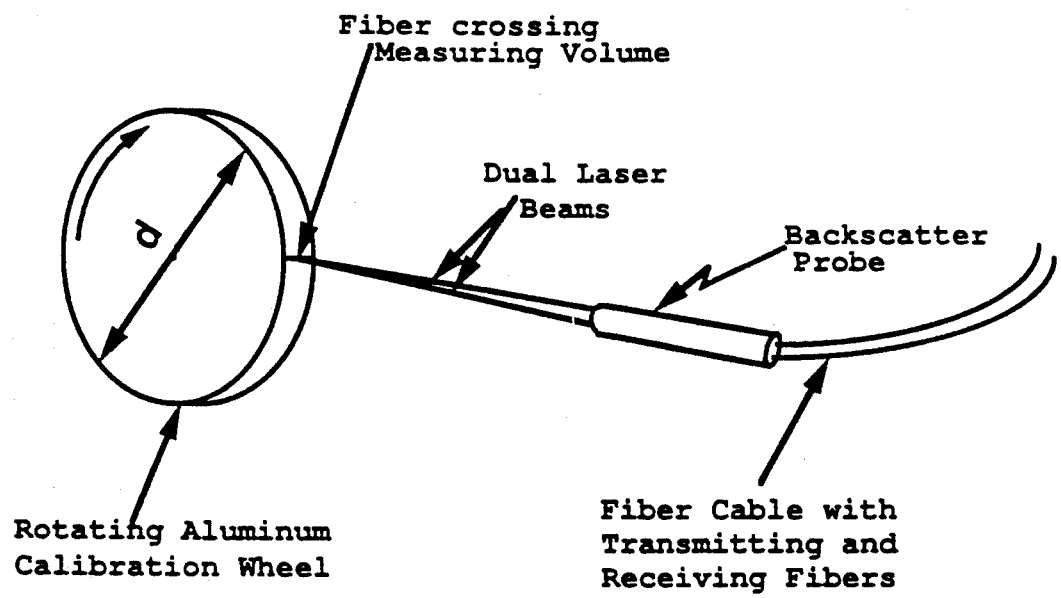
FIG. 4 is a diagram illustrating a laser beam aimed at a calibration wheel.
Figure 5:
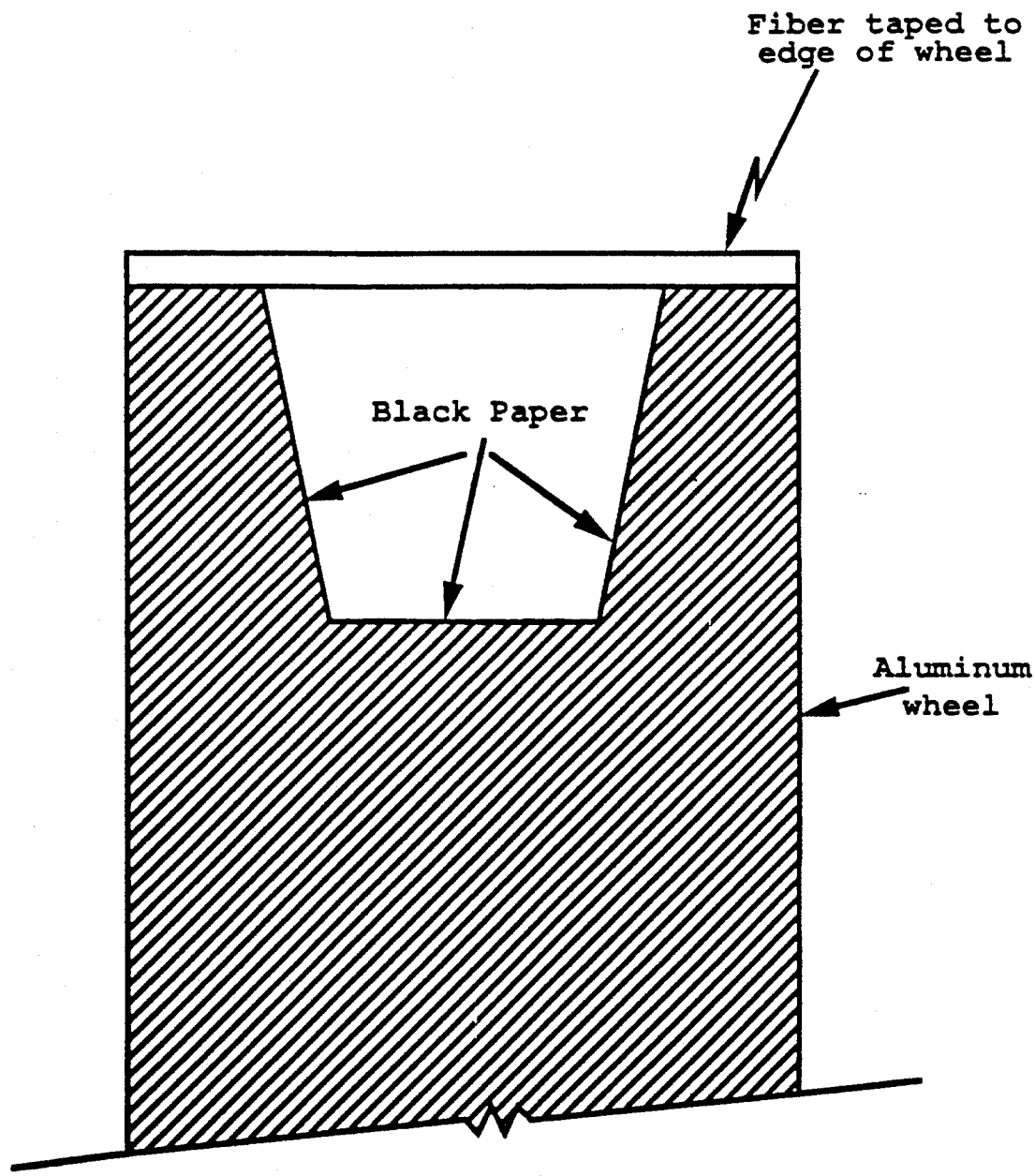
FIG. 5 is a cross-sectional view of a calibration wheel with a fiber attached.
Figure 6:
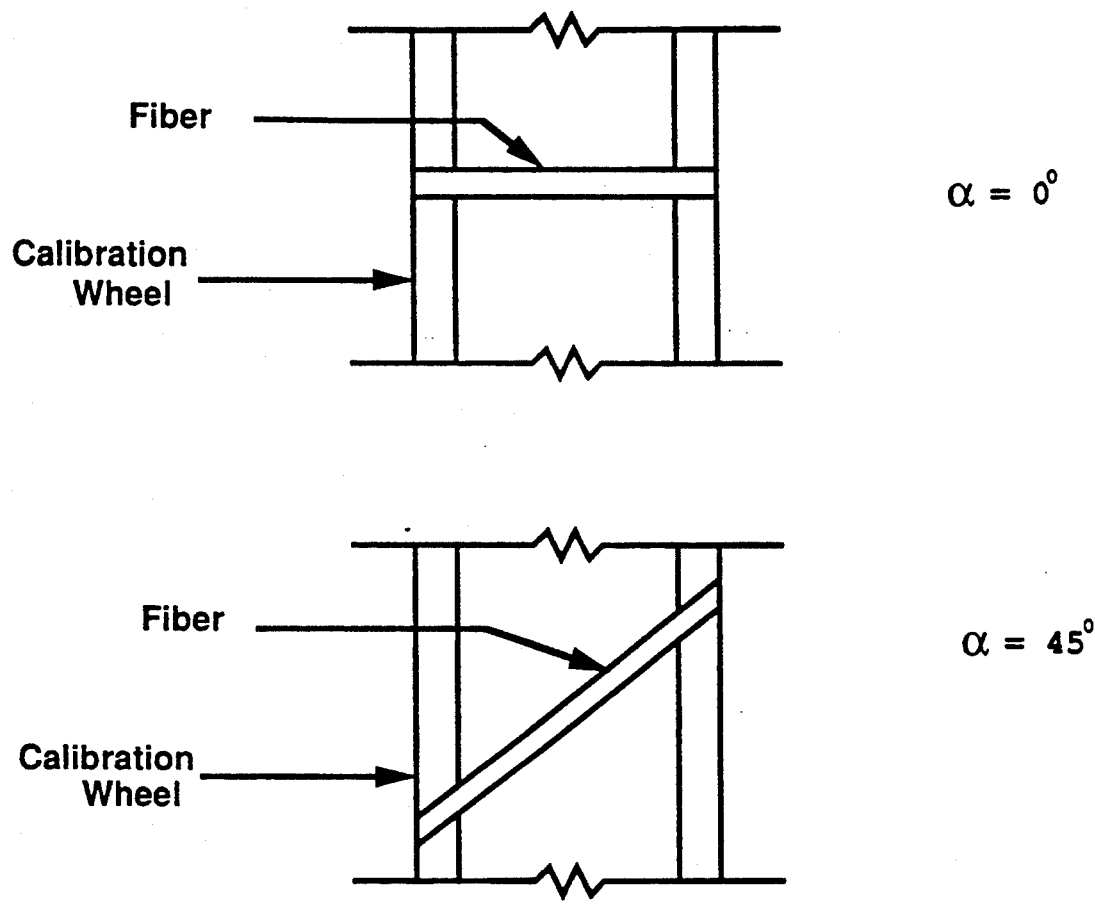
FIG. 6 is a diagram illustrating fibers attached to a calibration wheel at two different angles.
Figure 7:
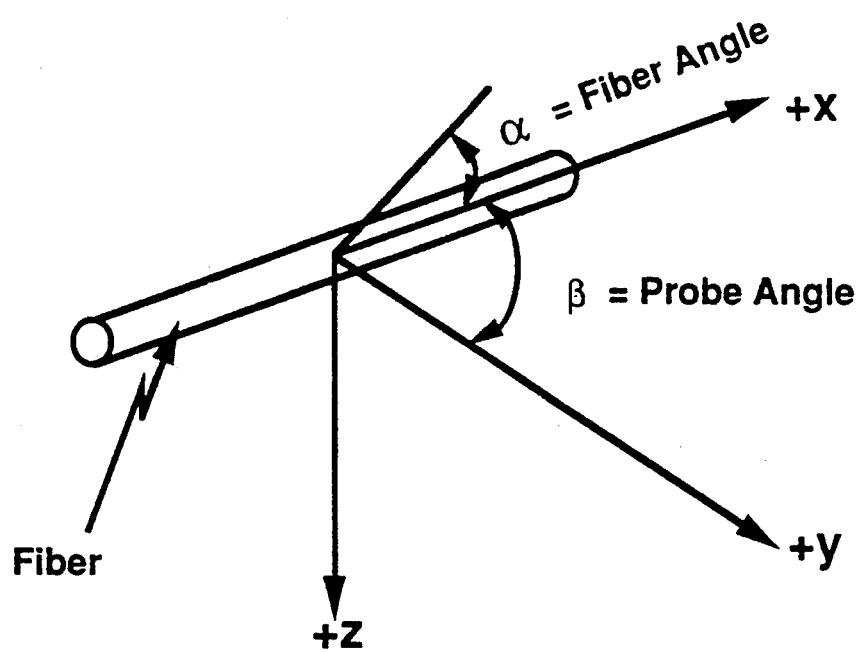
FIG. 7 is a diagram illustrating a fiber coordinate system.

The correlations were developed with a device called a calibration wheel, illustrated in FIG. 4. The calibration wheel consisted of an aluminum cylinder rotating with a known rim velocity and a wheel diameter of 171.5 mm. A DC motor with solid state control allowed the wheel speed to be varied continuously from 30 to 2000 RPM; this translated to a surface speed of 0.27–18.0 m/sec. A digital strobe light was used to measure rotational speed. For each set of correlation experiments, a single fiber was taped on the rim of the wheel as shown in FIG. 5 which also illustrates a cross-sectional view of the wheel. The LDV backscatter probe was situated such that the fiber passed through the laser measuring volume as the wheel rotated. The five major experimental variables in this process are as follows:

(1) fiber angle ($\alpha$)—the angle that the major axis of the fiber makes with a line that is both on the surface of the rim and parallel to the rotational axis of the calibration wheel (see the calibration wheel with $\alpha=45°$ in FIG. 6 and a diagram of $\alpha$ within the Fiber Coordinate System shown in FIG. 7).

(2) probe angle ($\beta$)—the angle made between the major axis of the probe and the fiber axis (see FIG. 7).

Figure 8:
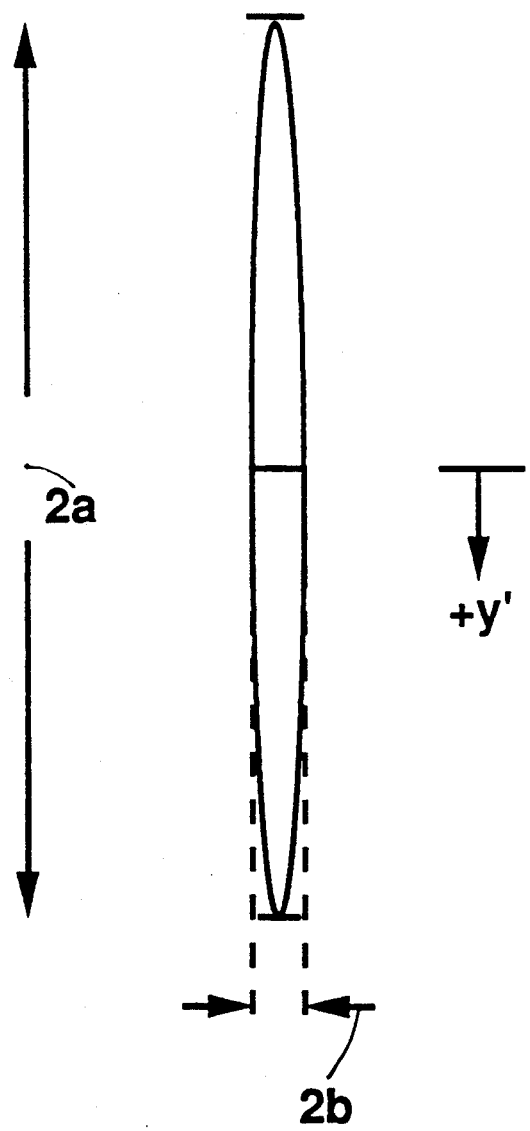
FIG. 8 is a diagram of the measuring volume of a dual beam laser probe.

(3) fiber-mv crossover (y')—the location within the mv where the fiber intersects the mv (see FIG. 8).

(4) motion of fiber relative to the fringes—the angle that the fiber motion vector makes with respect to the optical fringes of the mv.

(5) fiber diameter $\delta$—For the calibration wheel experiments the laser probe was mounted on the Velmex unit mentioned previously. The probe angle $\beta$ (illustrated in FIG. 7) was varied by moving the entire probe support stand and using a protractor to measure the probe angle to within ±1 degree. Note that $\beta=90°$ was where the probe had a "head on" view of the rim of the calibration wheel (as indicated in FIG. 6). After making a change in the probe angle, the Velmex unit was used to make the fine adjustments required to bring the measuring volume into the desired position relative to the fiber. This position could be varied from the point where the fiber just touched either end of the measuring volume to a position where the fiber went through the center of the measuring volume. A diagram of the measuring volume is given in FIG. 8. For FIG. 8, the laser wavelength was 0.6328 $\mu$m, the number of fringes was 30 and the working distance was 60 mm.

LASER DOPPLER VELOCIMETRY DATA RATE

Figure 10:
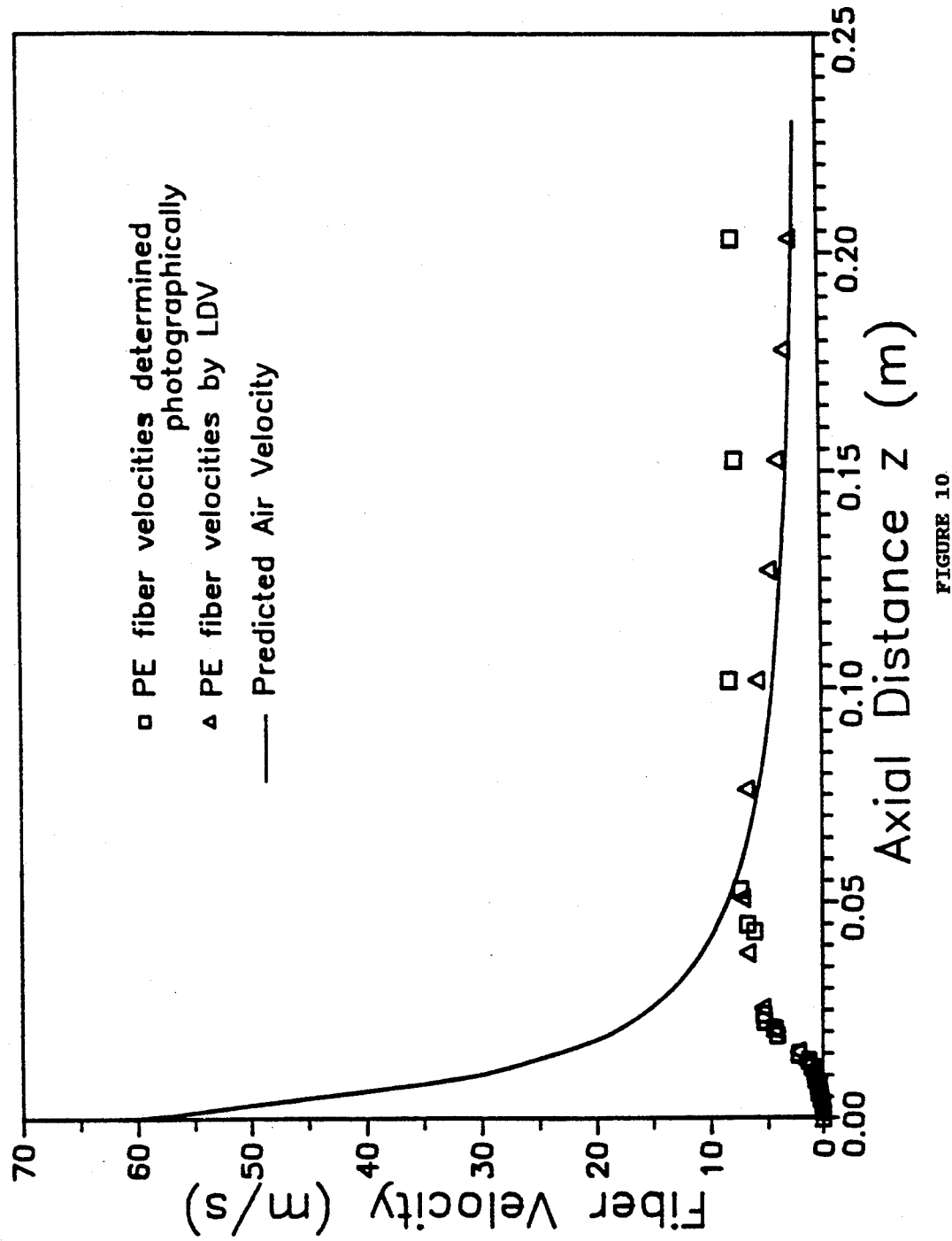
FIG. 10 is another graph comparing fiber velocities measured by LDV to velocities measured by photography.
Figure 11:
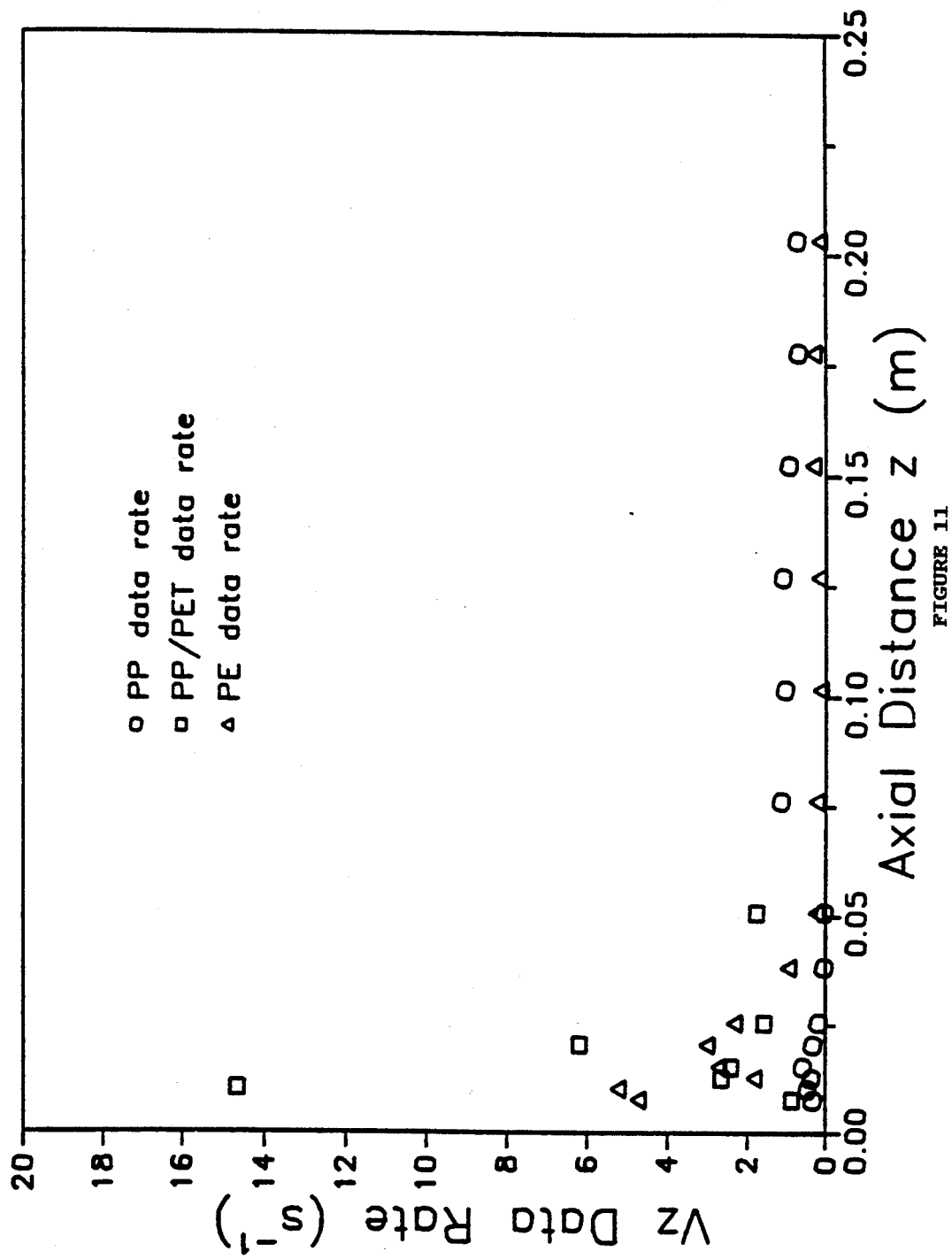
FIG. 11 is a graph comparing data rates of three different fiber types.

LDV data rate is a measure of the frequency of valid laser measurements detected during a specific time interval. As the number of fibers passing through the measuring volume during a given time period increases, the observed data rate will increase. FIG. 11 gives the data rates corresponding to the LDV velocity measurements in FIGS. 9 and 10. Besides pure PP and PE, velocity and data rate information are given (see FIGS. 9 and 11) for a PP/PET blend.

Figure 9:
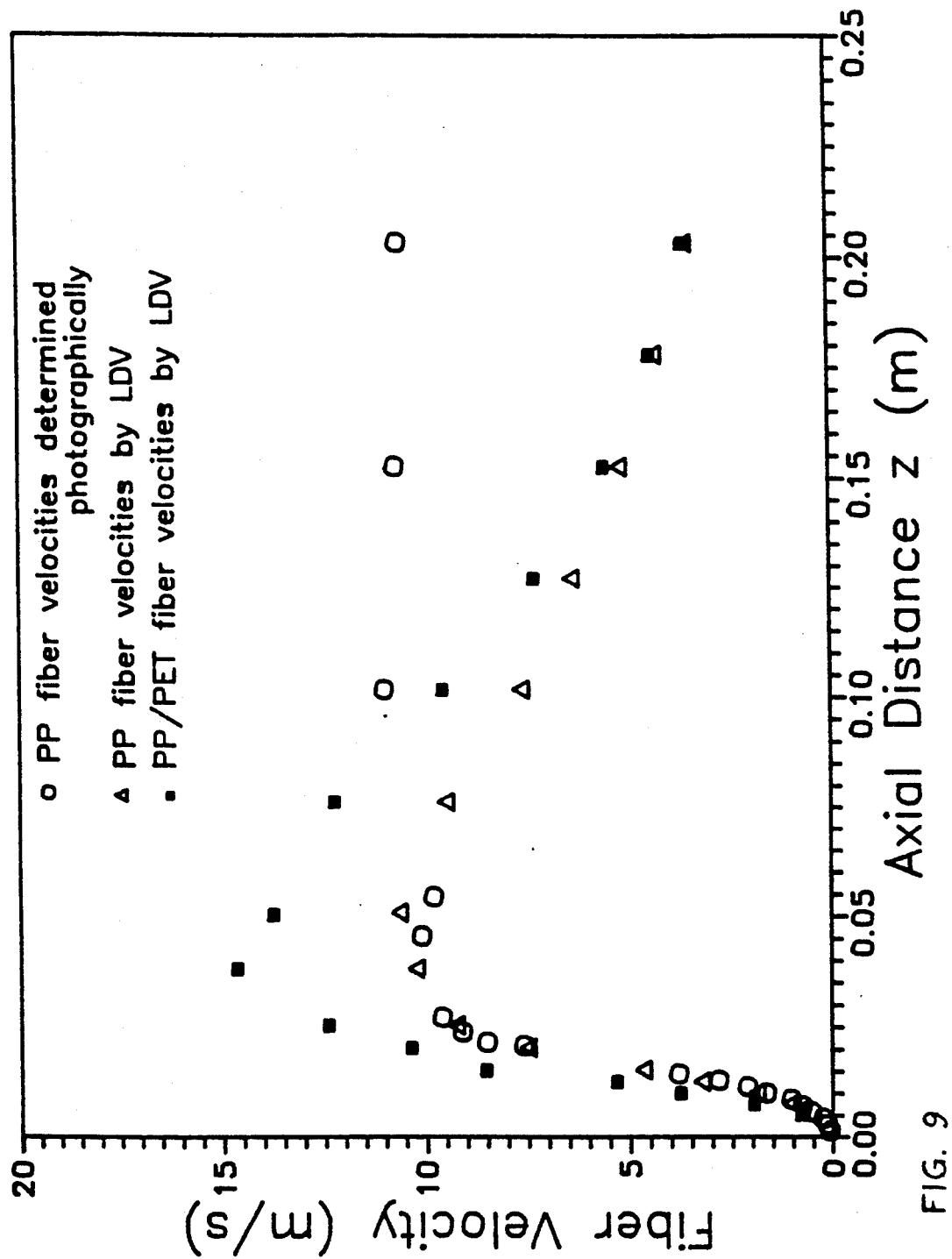
FIG. 9 is a graph comparing fiber velocities as measured by LDV to velocities measured by photography.

FIG. 9 shows a comparison of fiber velocities determined by LDV with fiber velocities determined by high speed photography. The region I conditions for the polypropylene were : gas rate=4.855 g/min, v $_{a,o}$=90 m/s, polymer rate=0.436 g/min, $T_p$=400° C., and $T_g$=395° C. The conditions for the PP/PET blend were the same as the conditions for the polypropylene. The polypropylene was FINA 54 MFR PP, the polyester was Kodak KODAPAK® 9899U, and the blend was 5% by weight PET. FIG. 10 shows a comparison of fiber velocity for polyethylene melt blowing. The region I conditions were: gas rate=3.884 g/min, v$_{a,o}$=62 m/s, polymer rate=0.484 g/min, $T_p$=305° C., and $T_g$=305° C. The polymer was DOW ASPUN® 6814 polyethylene.

Surface imperfections, solid particles or bubbles within the polymer stream, or interfaces within the polymer stream can all cause a Doppler signal to be created when these objects pass through the LDV measuring volume. As FIG. 11 shows, different polymer systems have different data rates. Additives in the PE may be the cause of the PE data rate being higher than the PP data rate. The very high PP/PET data rate is probably due to the interface between the phases.

Data rate determines how quickly a laser measurement can be made. For example, with a typical sample number setting of 256 (see Table 1), it took less than 20 seconds to make a velocity determination for the highest data rate on FIG. 11 (15/sec for the PP/PET system). However, several minutes were required to collect the required data for some of the points on FIG. 11.

(Note: for FIGS. 9-11 all LDV settings were kept constant except for the gain setting. The gain sometimes had to be reduced to prevent overload at high data rates.)

TABLE 1

LDV Equipment Settings

| | settings for comparison of LDV with high speed photography | settings for the calibration wheel experiments and the on-line zone experiments |
|---|---|---|
| Low limit filter | 0.03 MHz | 0.3 MHz |
| High limit filter | 1.0–5.0 MHz | 5 MHz–10 MHz |
| Counter mode | continuous | total burst count (TBC) |
| Frequency shift | 0 MHz | 2 MHz–5 MHz |
| Number of samples | 256 | up to 1024 |
| Number of cycles | 8 | 8 |
| Comparison | 1% | 1% |
| Gain | 0.5–0.8 | 0.8–1.2 |

USE OF THE CALIBRATION WHEEL

Based on preliminary experiments with the melt blowing machine and with the calibration wheel, a set of standard operating conditions were established for LDV measurements on fibers of arbitrary orientation (i.e., measurements in zone C). The final settings selected are shown in Table 1. The electronic filter settings (5.0 MHz and 0.1 MHz) were selected so they would bracket the rotational speed of the calibration wheel. The TBC mode was selected because it is the only counting mode that gives information on both burst time and total number of cycles in the burst and still allows the application of a comparison test to time measurements. The 1.5 gain setting and 1% comparison give an excellent combination of both signal visibility and noise reduction. A lower gain setting at 1% comparison criterion tends to bias against less visible fibers (for example, fibers crossing the mv at fiber angles of 30 or 45 degrees). A gain setting of 1.5 keeps the noise band safely below the +50 mV threshold. With a higher comparison setting (e.g., 10%) at a 1.5 gain setting, some random white noise is admitted as data. This is evident when the data rate and average velocity are increased as the high limit filter setting is increased. A 1% comparison test eliminates this phenomenon at a 1.5 gain setting. Finally, the number of cycles was chosen as 8 to both maintain adequate data rate and minimize fringe bias.

Figure 12:
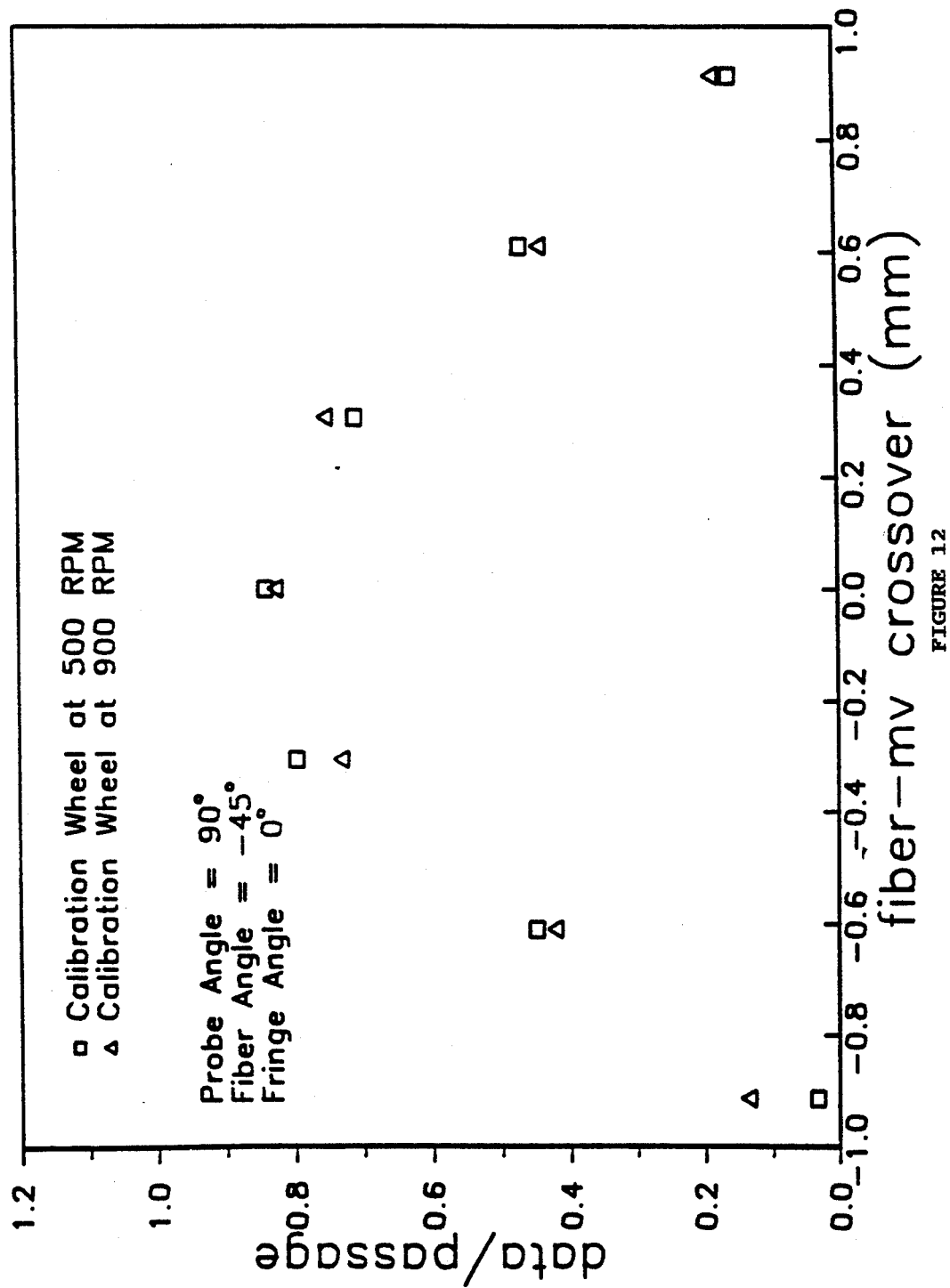
FIG. 12 is a graph comparing LDV results measured at different calibration wheel velocities.

Only one fiber was taped to the calibration wheel rim for each experiment. FIG. 12 shows the effect of calibration wheel speed and measuring volume (mv) position on data/passage (revolution of the wheel). In this case a single 28 μm nylon fiber was attached to the wheel. In FIG. 12, each revolution of the calibration wheel was shown to give the same LDV burst or group of bursts, regardless of the calibration wheel speed. The ordinate value, data/passage, is the number of LDV bursts counted by the LDV system for each passage (i.e., revolution of the calibration wheel) of the fiber through the mv.

The following five types of fiber were used in the calibration wheel experiments: 76 μm Du Pont industrial nylon, 28 μm Du Pont industrial nylon, 17 μm Dacron polyester, 10 μm polypropylene, and 7 μm polypropylene. The 10 and 7 μm fibers were produced by drawing 20 μm, region I melt blown fibers made from 54 MFR Fina Dypro ® polypropylene.

The five variables mentioned above—fiber angle, probe angle, fiber-mv crossover, fringe angle and fiber diameter—were tested experimentally in over a thousand separate combinations. The probe angles β were set at 90°, 75°, 60°, 45°, 30°, and 20°. The fiber angles α on the calibration wheel were set at 0°, 15°, 30°, 45°, 60°, and 75°. Fiber-mv crossover was varied at selected fiber angles (α=0°, 45°, and 75°). The angle between the fiber motion vector and the fringes was tested at 0°, 45°, and 60°, and the fiber diameter ranged from 7 to 76 μm.

LDV MEASUREMENTS IN ZONES B AND C

Figure 13:
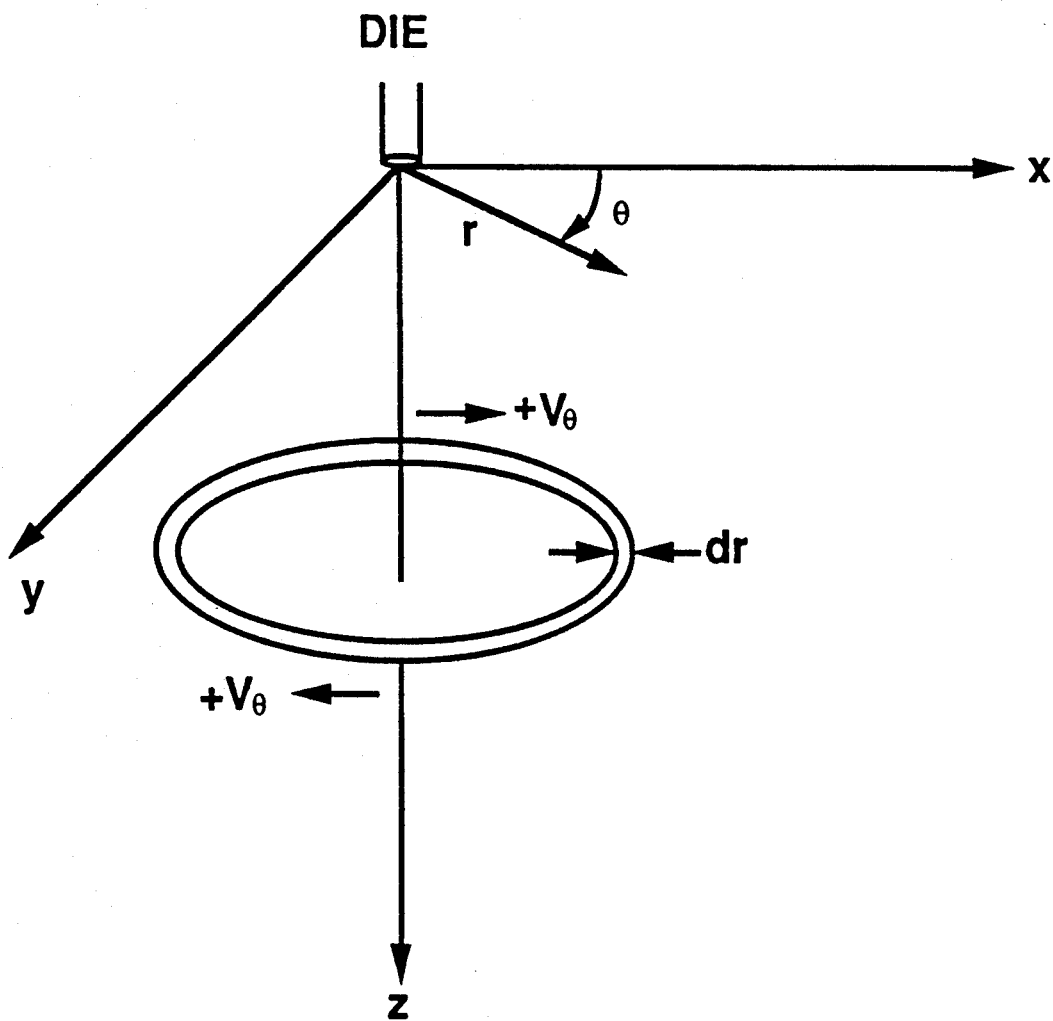
FIG. 13 is a diagram illustrating cylindrical and Cartesian coordinates systems used in analyzing a melt blown fiber stream.

With a single hole, annular melt blowing die, the fibers appear to move in roughly a "cone" of space with the apex of the cone near the die capillary and the base of the cone at the collection screen. Cylindrical symmetry would be expected in the fiber cone. FIG. 13 shows an appropriate cylindrical coordinate system for examining fibers below a single melt blowing orifice; this coordinate system is overlaid on the Cartesian (rectangular) coordinate system appropriate to the LDV positioning/traverse device.

Figure 14:
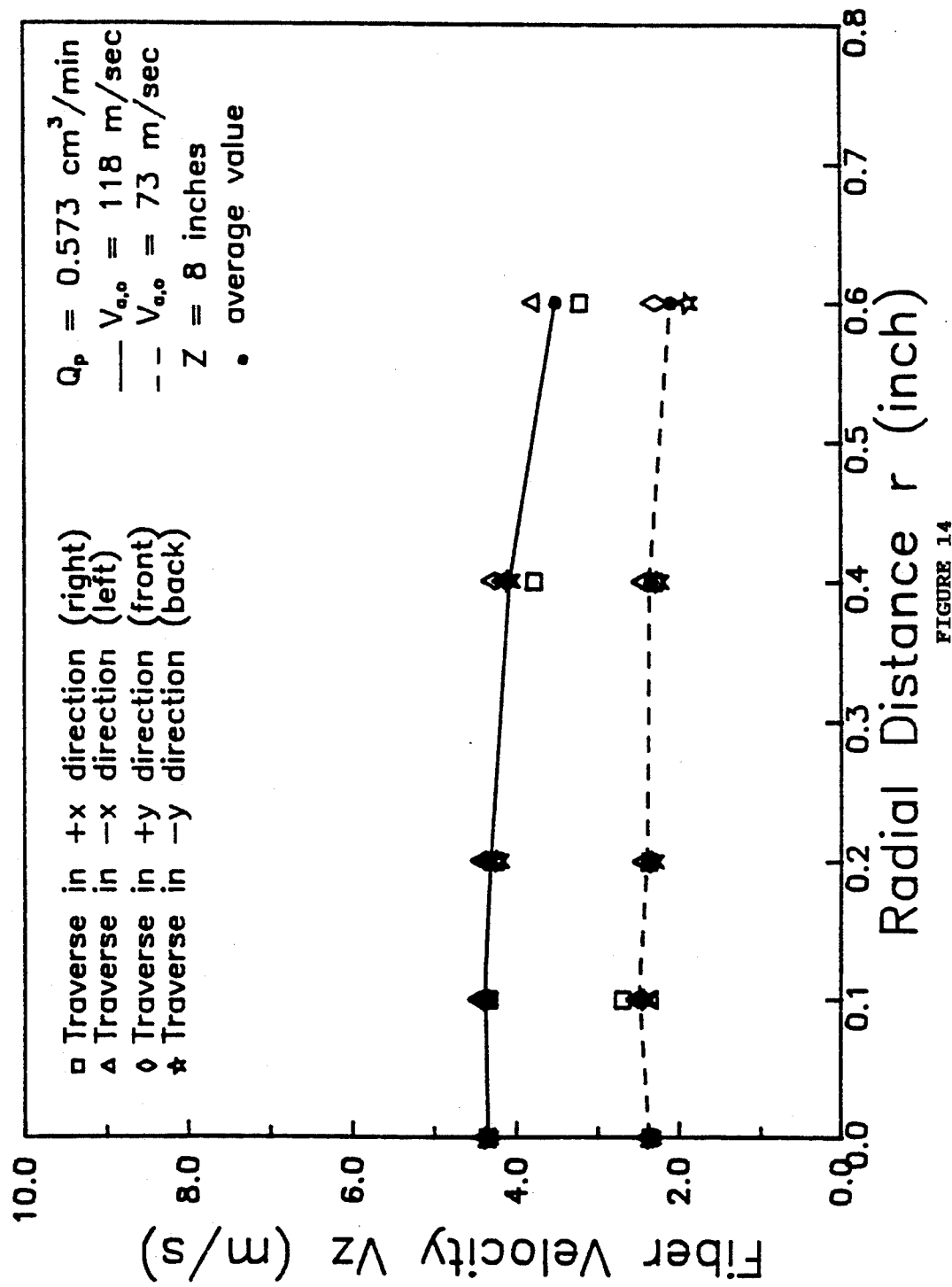
FIG. 14 is a graph comparing LDV fiber velocity measurements taken at different radial locations within the fiber stream for two air velocities.

With the same LDV settings used in the calibration wheel experiments (see Table 1), an extensive series of melt blowing experiments were run wherein LDV was used to measure fiber velocity and fiber concentration in zones B and C. FIG. 14 shows typical results of the LDV measurements of $v_z$. In FIG. 14, the measurements are compared at four symmetrically equivalent positions. The standard deviation of the data points taken at $v_{a,o}=118$ m/s ranged from 0.890 to 1.131 m/s. For $v_{a,o}=73$ m/s, the standard deviation ranged from 0.704 to 1.017 m/s. The operating conditions for the 73 m/s case were: gas rate=3.923 g/min, polymer rate=0.436 g/min, $T_p=395°$ C., and $T_g=400°$ C. For the 118 m/s case, the conditions were: gas rate=6.273 g/min, polymer rate =0.436 g/min, $T_p=395°$ C., and $T_g=400°$ C.

Because of the cylindrical symmetry of the melt blowing nozzle, the hypothesis that $v_z$ should be a function of r and not Θ was tested. The $v_z$ values were taken for different r values and for Θ=0°, 90°, 180°, and 270°, or, in terms of the Cartesian system, traverse in the +x, +y, −x, and −y directions, respectively. As FIG. 14 shows, there was little apparent dependence on Θ for a given gas velocity. For the 118 m/s curve, a Student t-test was done on the points of widest spread at r=0.4 inches (i.e., the +y direction and +x direction points). Even for these points, the $v_z$ values are so close that the t statistic shows insignificance even at a 20 per cent probability level.

Figure 15:
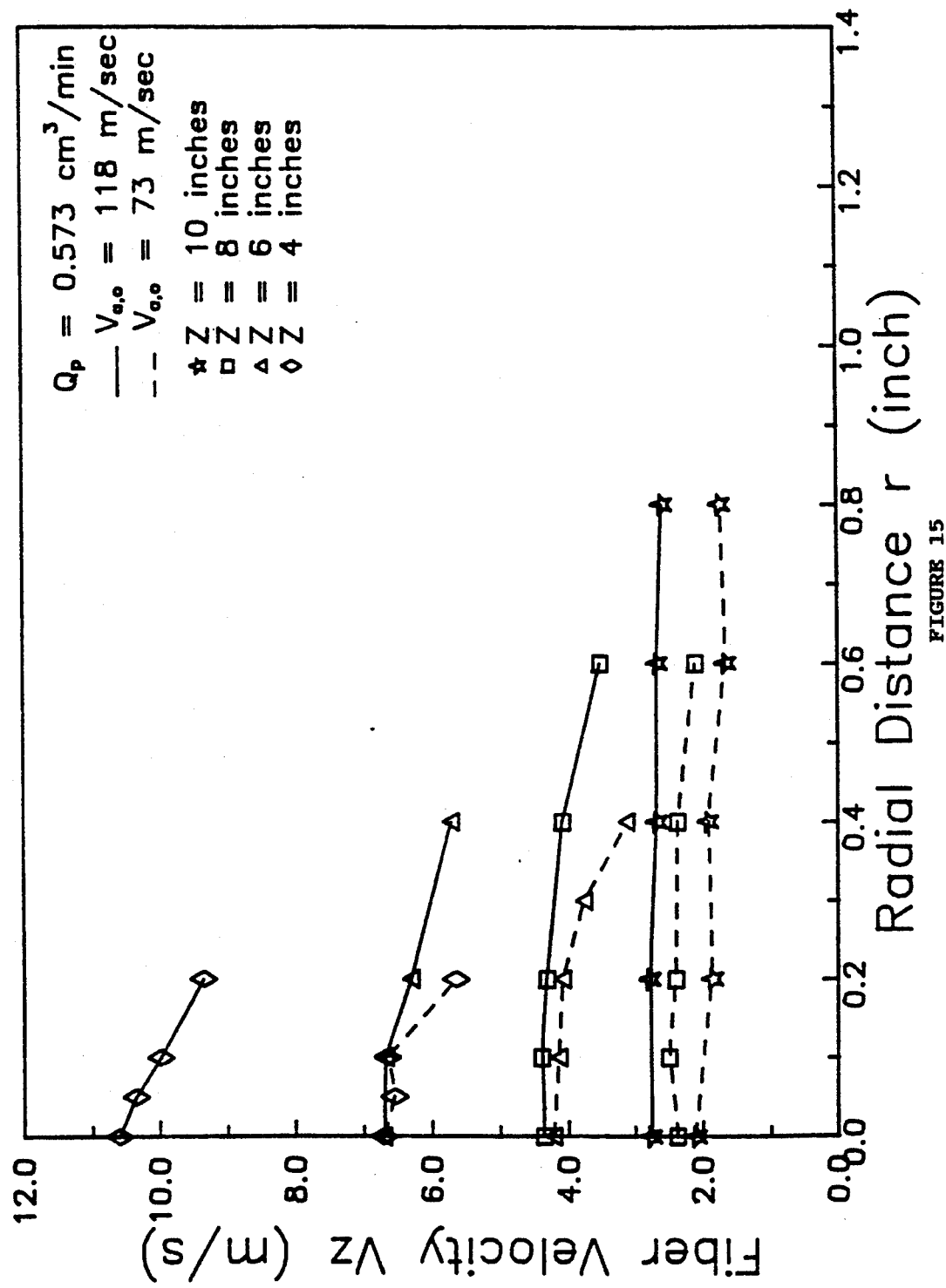
FIG. 15 is a graph comparing LDV fiber velocity measurements taken at different locations for two air velocities.
Figure 16:
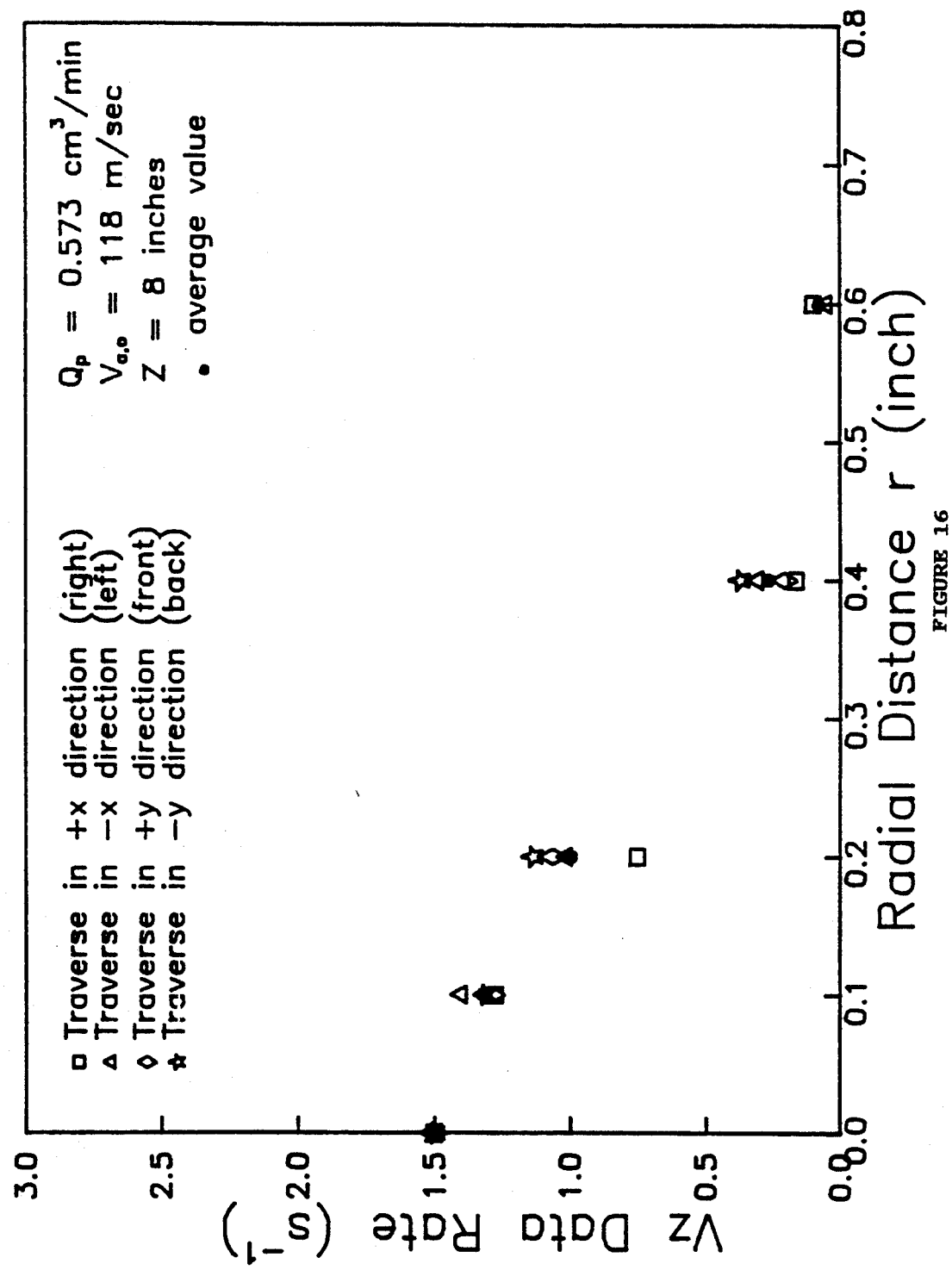
FIG. 16 is a graph comparing LDV data rate for different distances from the fiber stream center.
Figure 17:
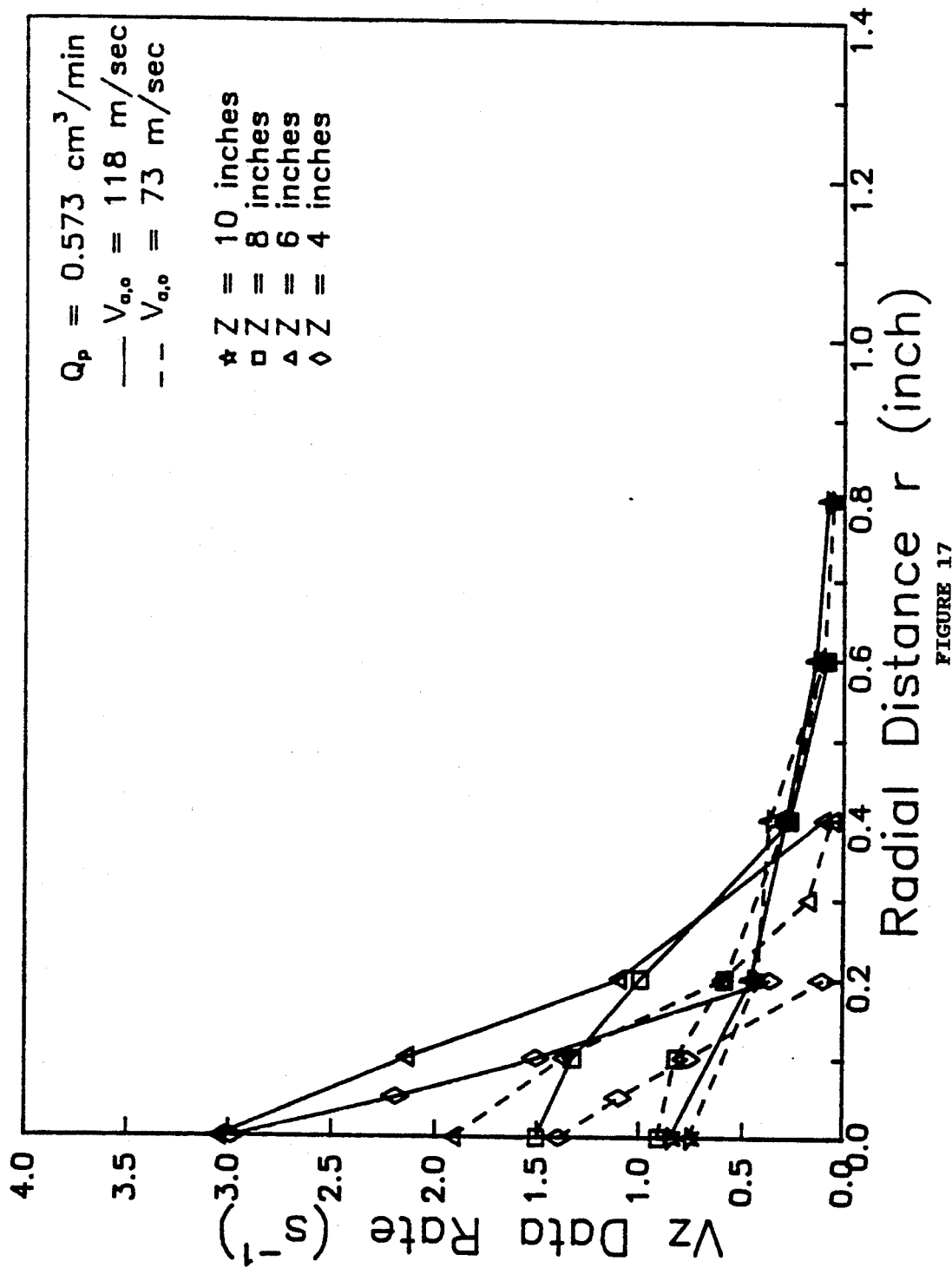
FIG. 17 is a graph comparing LDV data rates taken for various z and r values at two air velocities.

FIG. 15 shows $v_z$ values for two different gas velocities and four different z values (horizontal planes) below the die. The symboled points are averages of the velocities taken at multiple Θ positions. For both the 118 m/s and 73 m/s gas velocities, the trends are the same: fiber velocities near the die are large and have a "peaked" distribution; fiber velocities far from the die are low and the distribution is flat. FIG. 16 shows typical values of data rate for measurements of $v_z$. As can be observed, data rate drops off rapidly for increased r indicating a reduced presence of fibers. FIG. 17 shows the $v_z$ data rates corresponding to the velocity measurements in FIG. 15 (two different gas velocities and four different horizontal planes). Analogous to FIG. 15, the symboled points in FIG. 17 are averages of data rates taken at multiple Θ positions. The approximate abscissa intercept of each curve is a good estimate of the cone radius at each z value.

USING DATA RATE TO CALCULATE MASS FLUX

With the assumption of cylindrical symmetry, a data rate $D(r,z)$ can be defined. For a particular fiber diameter distribution, assume that the mass flux of fibers in the z direction is proportional to $D(r,z)$. Thus, the following relationship can be written:

$$\text{mass flux} = \frac{\text{mass of fibers}}{\text{area} \cdot \text{time}} = k \cdot D(r,z) \quad (1)$$

where k is a proportionality constant.

Integrating the mass flux across a plane of constant z gives:

$$\dot{m}(z) = \frac{\text{mass of fibers}}{\text{time}} = k \cdot \int_{r=0}^{r=\infty} D(r,z) 2\pi r \, dr \quad (2)$$

FIG. 13 illustrates one of the differential rings over which data rate is integrated in Equation 2. For a fixed polymer throughput, $\dot{m}(z)$ will be a constant at any z value.

Given a known $\dot{m}$ and the integral determined from the values of $D(r,z)$, specific values of k can be calculated for any particular value of z:

$$k = \frac{\dot{m}(z)}{\int_{r=0}^{r=\infty} D(r,z) 2\pi r \, dr} \quad (3)$$

FIG. 17 has the appropriate values of $D(r,z)$ to allow the calculation of the integral in Equation 3. For this calculation the $D(r,z)$ curves were approximated as shown on FIG. 17 (straight lines were drawn between the data points) and numerical integration was done by Simpson's rule as prescribed by R. W. Hornbeck, in *Numerical Methods*, 1st ed., pp. 148–150, Prentice-Hall, Inc., Englewood Cliffs, N.J., 1975.

Table 2 contains the k values calculated from the values of the integral and the known $\dot{m}$. For the high gas velocity, the k value becomes nearly constant for fairly low values of z ($z \geq 6$ inches). For the low gas velocity, the k value becomes constant for $z \geq 8$ inches. However, the final k value for $z \geq 10$ inches (the distance closest to the fiber collection screen) is virtually the same for both gas velocities. Thus k is seen to become constant for fibers inside zone C, the zone of random fiber orientation. This important observation is an unexpected result of this research.

TABLE 2

| | | k values | | | |
|---|---|---|---|---|---|
| $v_{a,o}$ | m | \multicolumn{4}{c}{$k*10^2$ (kg/m$^2$)} |
| (m/s) | (kg/s) | z = 4" | z = 6" | z = 8" | z = 10" |
| 73 | 7.29 × 10$^{-6}$ | 18.836 | 5.585 | 3.294 | 2.897 |
| 118 | 7.29 × 10$^{-6}$ | 8.390 | 3.074 | 2.604 | 2.819 |

That k can be assumed to be constant for the zone of random fiber orientation is valuable information for the control and measurement of product quality and the use of laser Doppler velocimetry as a measurement tool. Once the value of k has been calculated for particular melt blowing conditions (such as those described in Kayser and Shambaugh, 1990, referred to before), later measurements of the data rate taken during production runs can be used to determine the mass flux of fibers on-line. The data rate is simply multiplied by the k value to determine the mass flux of the fiber stream at any particular location within the random zone.

It is noted here that Equations 1–3 are based upon the assumption that data rate measurements are taken over a plane of cylindrical symmetry. It will be obvious to one familiar with the art that other formulations of these equations can be derived to accommodate assumptions appropriate to other fiber-producing die configurations. An example would be an equation similar to Equation 2 but based on Cartesian (rectangular) coordinates rather than radial coordinates.

Additionally, although melt blowing relies on an inert gas such as air as the fluid medium to carry the fibers, the fiber stream measurement methodology of the present invention could also be used in technologies in which the fluid medium was comprised of a liquid such as water. Furthermore, it is possible that there are methods or technologies other than laser Doppler velocimetry which can be used to measure or determine a quantity similar to data rate or a k value which do not depart from the basic principles, elements, spirit and scope of the present invention.

MEASUREMENT OF FILAMENT DIAMETER

The laser Doppler velocimetry technology described above could also be employed in the determination of filament or fiber bundle diameter by measuring fiber velocity. Maintaining consistency in the diameters of fibers or filaments is important in the manufacture of various products produced during spunbonding, melt spinning and region I melt blowing, where the fibers produced from a heated polymer tend to maintain a filamentous character rather than splitting into tiny fibers (however, even in spite of fiber splitting and breaking, a measurement of fiber diameter can still be made during region II and region III melt blowing). If polymer mass throughput per hole (grams per minute per hole), polymer density (gm per cm$^3$) and filament velocity (meters per minute) are known, the cross-sectional area or $A_c$ (cm$^2$), of the filaments can be determined.

The value of $A_c$ can then be used to calculate the diameter d of the filament having a circular cross-section by using the following relations:

$$A_c = \frac{(\text{mass throughput})}{(\text{density})(\text{velocity})} \quad (4)$$

$$A_c = \pi r^2 = \frac{\pi d^2}{4} \quad (5)$$

$$d = \sqrt{\frac{4 \cdot A_c}{\pi}} \quad (6)$$

For filaments which have a non-circular cross-section, an "equivalent diameter", or $D_{eq}$, can be calculated using the following relation:

$$D_{eq} = (4) \left( \frac{\text{cross-sectional area of filament}}{\text{cross-sectional perimeter of filament}} \right) \quad (7)$$

Using laser Doppler velocimetry, a filament velocity and thus filament diameter can be calculated for every filament at each hole along the spinneret die or forwarding jet or gun (e.g., in spunbounding) when the velocity measurements are taken near the die opening (where the filaments are intact), for example, in Region I of a melt blowing process.

Description of the Preferred Embodiment of the Apparatus and Method

Referring to FIG. 18, reference character 10 generally designates an apparatus for the on-line measurement of fiber flow constructed pursuant to the present invention. The apparatus includes a previously-heated fiber-forming thermoplastic polymer resin 11 which is introduced into a melt blowing die chamber 11a and is forced through one or more orifices 12 in a die head 14. The resin strand 15 is extruded through the die orifice 12 into a stream of gas supplied by gas slots 20 and 22. The gas stream attenuates the resin strand or strand into a stream 24 of discrete fibers which are collected on a moving collection screen 26 to form a continuous fiber mat 28. The gas emanating from gas slots 20 and 22 which attenuate the molten resin strand or strands 15 is introduced into gas lines 16 and 18 which supply the gas slots 20 and 22. The gas used is often air but could be some other inert gas which is heated to a high temperature similar to the temperature of the molten resin 15.

In FIG. 18, the die head 14 is shown as having a vertical orientation wherein the stream 24 is directed in a downward direction. However, the die head 14, in another embodiment, could be mounted sideways so that the stream 24 would be directed horizontally onto a horizontally mounted collection screen 26.

The means for scanning the fiber stream 24, includes at least one laser backscatter probe 46 engaged and supported by a positioning assembly system 56 which has a vertical positioning element 57a for changing the vertical position of the probe 46, a lateral positioning element 57b for changing the horizontal position of the probe 46 and a distal/proximate positioning element 57c for changing the backward/forward position of the probe 46 in relation to the fiber stream 24. The terms "vertical positioning element 57a", "lateral positioning element 57b" and "distal/proximate positioning element 57c" mean, respectively, any mechanical elements which would permit the positioning of the laser probe 46 in the vertical, horizontal or backward/forward positions.

The system 10 shown includes a 1-D laser system where velocities are measured in only one direction. Commercially available 2-D or 3-D systems could also be used similarly to measure velocities simultaneously in two or three dimensions, respectively. Additionally, instead of the mechanical traversing system 56, some other optical refocusing or positioning method could be used to reposition the laser beams 48 and 50.

The laser beam supplied to the probe 46 is supplied by a laser generating device 30 (designated "LASER" in FIG. 18) which directs the laser beam to a beamsplitter 32 to split the laser beam into two separate beams, a first beam 48 and a second beam 50. The beam 48 is further acted upon by a Bragg cell 34, which causes a shift in the frequency of beam 48 so that the first beam 48 and the second beam 50 now have different frequencies (it will be understood that the Bragg cell acts either on the first beam 48 or the second beam 50 but for the purposes of this description, the first beam 48 is the beam assumed to have been acted on).

After leaving the Bragg cell 34, the first beam 48 is transferred by a cable 36 and the second beam 50 is transferred by a cable 38 to a junction 40 where the first beam 48 and the second beam 50 are transferred by a transmitter cable 42 to the backscatter probe 46. In the backscatter probe 46 the first beam 48 and the second beam 50 are focused such that they converge at a single point 52 where they form a measuring volume which defines a particular test area within the fiber stream 24.

The position of the backscatter probe 46 can be changed by using the positioning assembly system 56 so that the measuring volume 52 is located at some desired point within the fiber stream 24. As fibers within the fiber stream 24 cross the measuring volume 52 of the first beam 48 and the second beam 50, optical impulses 54 are created which travel back toward the direction of the probe 46. The optical impulses 54 are detected by a detector 47 within the probe 46 and are transmitted via the receiving cable 44 to the cable junction 40 where they are further transmitted to a photodetector 58 which converts the optical impulses 54 into electrical impulses. The electrical impulses are transmitted to a downmixer 60 which further transfers the electrical impulses to a signal processor/counter 62. The signal processor/counter 62 provides numerical output in the form of fiber velocities and data rates, information which can be further transmitted to an electronic computing device 66 which can further process, analyze and display the data. Additionally, the electrical signals are transmitted from the processor/counter 62 to an oscilloscope 64 which can be used for observation of the Doppler bursts created when the fibers of the fiber stream 24 cross the measuring volume 52.

The embodiment shown in FIG. 18 describes a backscatter laser probe 46, into which the detector 47 is incorporated; however, the detector 47 could also be located in a forward position or some other spatial position (e.g. 170°) relative to the position of the laser beam source for the purpose of detecting scattered optical impulses.

Turning to the method of the present invention, a specific location within the fiber stream 24 is selected to be scanned. The position of the laser probe 46 is arranged by the positioning assembly system 56 so that the measuring volume 52 formed by the intersection of the first beam 48 and the second beam 50 rests at the specific test area location desired to be scanned. A data rate is recorded for the specific test area location. Generally the location to be scanned will be within the zone of random fiber orientation 68 which is at some distance 70 from the orifice 12 of the fiber stream 24. Under certain circumstances other zones of the fiber stream at distances nearer to the fiber stream orifice 12 which exhibit less random fiber orientations may be desired to be scanned. Additionally, it may be useful at times to locate the measuring volume 52 very near (as close as 0.07 mm) a particular orifice 12 to measure the stream velocity and data rate, thereby characterizing a specific mass flow problem at a specific orifice within a die head 14 possessing a plurality of orifices.

Once a data rate is obtained it is multiplied by a conversion factor k (previously described) determined for the particular fiber handling conditions. The product of this multiplication step (such as shown in Equation 1) is the value for the mass flux, or mass per area per time, of the fibers moving through the test area of the fiber stream and may be calculated using an electronic computing or calculating device. Once this mass flux value is known, the parameters which affect the flow of the fiber stream 24 may be adjusted to achieve some predetermined and more optimal stream flow rate. The method for making this adjustment could involve some automatic means (not shown), able to change the air velocity and/or air profile coming out of slot 20 or 22, adjust the effective size of orifice 12 or the polymer flow rate or cause some other effect which would ultimately improve the quality of the fiber mat product 28. This adjustment could also be made in response to velocity or data rate information obtained from a specific orifice.

Since the conversion factor k used to determine mass flux may not be known a priori for a particular set of operating conditions or type of polymer resin, the step of selecting the conversion factor k may involve the separate calculation of k for the particular set of operating conditions. A k can be calculated by determining a set of data rates measured across a plane within the fiber stream 24 where the plane is a given distance 70 from the origin (orifice 12) of the fiber stream 24 and the distance 70 is within the zone of random orientation 68 within the fiber stream 24. This set of data rates is obtained by changing the position of the probe 46 by changing the lateral positioning element 57b and distal/proximate positioning element 57c of the positioning assembly system 56 to effect the repeated repositioning of the measuring volume 52 on the plane at given distance 70 from the origin 12. The set of data rate values is then used to calculate an integral of the general form of the integral shown in Equation 2 for the area of the plane. The integral can be calculated, preferably with an electronic computing or calculating device. Additionally, a value for $\dot{m}(z)$ (see Equation 2), defined as mass throughput (mass per time) of polymer material moving through the die, is determined. One way $\dot{m}(z)$, or mass throughput, can be determined is to measure how much polymer 11 passes through the die 14 during a given period of time. The units of $\dot{m}(z)$ are mass per time. With the data rate integral and the mass throughput, $\dot{m}(z)$, the conversion factor k can be determined using an equation of the form of Equation 3 where the known mass per time is divided by the integral of the set of data rates.

An example of a situation in which a different form of the integral of Equations 2 and 3 may be required is if the die was composed of a multiple number of orifices linearly organized endowing the horizontal cross-section of the fiber stream with the approximate overall dimensions of a rectangle. In that case an integral using rectangular Cartesian coordinates may be preferable to Equations 2 and 3 which are based on cylindrical coordinates.

It will be understood that even though the discussion has related specifically to polymer fiber handling, the technology described herein could also relate to the application of LDV to other technologies involving metal, glass, ceramics, minerals, including silica fibers, natural organic materials including wood, paper, cotton and cellulose, or combinations thereof.

Changes may be made in the embodiments of the invention described herein or in parts of the elements of the embodiments described herein or in the steps or in the sequence of steps of the methods described herein without departing from the spirit and scope of the invention as defined in the following claims.

What is claimed is:

1. A method for measuring the mass per area per time of a fiber stream, comprising:
    scanning a test area within the fiber stream by passing electromagnetic radiation into a zone of random orientation in the fiber stream within which zone the fibers are substantially randomly oriented;
    measuring the number of impulses detected from the test area during a predetermined time interval and outputting the number as a date rate; and
    combining the data rate and a predetermined conversion factor to obtain a mass per area per time of the fibers in the fiber stream wherein the conversion factor is substantially constant within the zone of random orientation of the fiber stream for a particular mass throughput.

2. The method of claim 1 wherein the step of scanning a test area within the fiber stream further comprises:
    providing a laser;
    splitting the laser beam into a first beam and a second beam;
    changing the frequency of one of the beams;
    aiming the first beam and the second beam at the fiber stream;
    causing the first beam and the second beam to intersect at a focal point within the fiber stream to form a measuring volume wherein the fibers which pass through the measuring volume cause the scattering of light of the first beam and the second beam creating optical impulses; and
    detecting the optical impulses with an optical receiving device.

3. The method of claim 1 wherein in the step of combining the data rate and a conversion factor to obtain a mass per area per time, the conversion factor is determined by:
    selecting a plane within the zone of random orientation;
    taking a set of data rate measurements from different locations across the plane; and
    dividing the mass throughput by an integral calculated from the set of data rate measurements.

4. The method of claim 3 wherein the step of taking the set of data rate measurements across a plane further comprises:
    providing a laser;
    splitting the laser beam into a first beam and a second beam;
    changing the frequency of one of the beams;
    aiming the first beam and the second beam at the fiber stream;
    causing the first beam and the second beam to intersect at a focal point on the plane within the fiber stream to form a measuring volume wherein the fibers which pass through the measuring volume cause the scattering of light of the first beam and second beam creating optical impulses;
    detecting the optical impulses with an optical receiving device; and
    repositioning the measuring volume to other points on the plane wherein additional data rate measurements are taken.

5. The method of claim 1 wherein the step of combining the data rate and the conversion factor to obtain a number representing mass per area per time further comprises:
    multiplying the data rate by the conversion factor.

6. The method of claim 1 further comprising:

adjusting the fiber stream in response to the number representing mass per area per time to achieve a predetermined fiber stream flow rate.

7. The method of claim 1 wherein the step of scanning a test area within the fiber stream further comprises:
moving the test area to a position very near at least one specific orifice whereby the velocity and data rate of fibers leaving the specific orifice is measured.

8. The method of claim 1 further comprising a fiber selected from the group consisting of metal, glass, polymer, ceramics, minerals, including silica fibers, natural organic materials including wood, paper, cotton and cellulose, or combinations thereof.

9. The method of claim 1 wherein in the step of scanning a test area within the fiber stream the electromagnetic radiation passed into a zone of random orientation further comprises a laser beam.

10. A method of measuring the equivalent diameter of a filament produced by a filament-producing apparatus where the filament has a non-circular cross-section, the filament is substantially continuous, and a mass throughout, a density and a cross-sectional perimeter are known for the filament, comprising:
scanning the filament using laser Doppler velocimetry and outputting a filament velocity;
manipulating the mass throughput, the density and the velocity to determine the cross-sectional area of the filament; and
determining the filament equivalent diameter from the filament cross-sectional area and the filament cross-sectional perimeter.

11. The method of claim 10 wherein the step of manipulating the mass throughput, the density and the velocity further comprises:
dividing the mass throughput by the product of the density and the velocity.

12. The method of claim 10 wherein the step of determining the filament equivalent diameter from the filament cross-sectional area further comprises:
multiplying the cross-sectional area by 4 to determine a product and dividing the product by the cross-sectional perimeter.

13. The method of claim 10 further comprising a fiber selected from the group consisting of metal, glass, polymer, ceramics, minerals, including silica fibers, natural organic materials including wood, paper, cotton and cellulose, or combinations thereof.

14. A method of measuring the diameter of a filament having a substantially circular cross-section produced by a filament-producing apparatus where the filament is substantially continuous and the parameters of mass throughput and density are known, comprising:
scanning the filament using laser Doppler velocimetry and outputting a filament velocity;
manipulating the mass throughput, the density and the velocity to determine the cross-sectional area of the filament; and
determining the filament from the filament cross-sectional area.

15. The method of claim 14 wherein the step of manipulating the mass throughput, the density and the velocity further comprises:
dividing the mass throughput by the product of the density and the velocity.

16. The method of claim 14 wherein the step of determining the filament diameter from the filament cross-sectional area further comprises:
multiplying the cross-sectional area by 4 to determine a first product, multiplying the first product by the reciprocal of pi to determine a second product, and taking the square root of the second product to determine the filament diameter.

17. The method of claim 14 further comprising a fiber selected from the group consisting of metal, glass, polymer, ceramics, minerals, including silica fibers, natural organic materials including wood, paper, cotton and cellulose, or combinations thereof.

18. A method of measuring the equivalent diameter of a filament produced by a filament-producing apparatus where the filament has a non-circular cross-section, the filament is substantially continuous, and a mass throughput, a density and a cross-sectional perimeter are known for the filament, comprising:
scanning the filament by:
providing a laser,
splitting the laser beam into a first beam and a second beam,
changing the frequency of one of the beams,
aiming the first beam and the second beam at the filament stream causing the first beam and the second beam to intersect at a focal point on the filament stream to form a measuring volume wherein the filaments which pass through the measuring volume cause the scattering of light of the first beam and the second base creating optical impulses,
detecting the optical impulses with an optical receiving device,
transmitting the optical impulses to a photodetector device wherein the optical impulses are converted into electrical impulses, and
converting the electrical impulses into a filament velocity;
outputting the filament velocity;
manipulating the mass throughput, the density and the filament velocity to determine the cross-sectional area of the filament; and
determining the filament equivalent diameter form the filament cross-sectional area and the filament cross-sectional perimeter.

19. The method of claim 18 wherein the step of manipulating the mass throughput, the density and the velocity further comprises:
dividing the mass throughput by the product of the density and the velocity.

20. The method of claim 18 wherein the step of determining the filament equivalent diameter from the filament cross-sectional area further comprises:
multiplying the cross-sectional area by 4 to determine a product and dividing the product by the cross-sectional perimeter.

21. The method of claim 18 further comprising a fiber selected from the group consisting of metal, glass, polymer, ceramics, minerals, including silica fibers, natural organic materials including wood, paper, cotton and cellulose, or combinations thereof.

22. A method of measuring the diameter of a filament having a substantially circular cross-section produced by a filament-producing apparatus where the filament is substantially continuous and the parameters of mass throughput and density are known, comprising:
scanning the filament by:

providing a laser beam, splitting the laser beam into a first beam and a second beam, changing the frequency of one of the beams, aiming the first beam and the second beam at the filament stream causing the first beam and the second beam to intersect at a focal point on the filament stream to form a measuring volume wherein the filaments which pass through the measuring volume cause the scattering of light of the first beam and the second beam creating optical impulses, detecting the optical impulses with an optical receiving device, transmitting the optical impulses to a photodetector device wherein the optical impulses are converted into electrical impulses, and converting the electrical impulses into a filament velocity;

outputting the filament velocity;

manipulating the mass throughput, the density and the velocity to determine the cross-sectional area of the filament; and determining the filament diameter from the filament cross-sectional area.

23. The method of claim 22 wherein the step of manipulating the mass throughput, the density and the velocity further comprises:

dividing the mass throughput by the product of the density and the velocity.

24. The method of claim 22 wherein the step of determining the filament diameter from the filament cross-sectional area further comprises:

multiplying the cross-sectional area by 4 to determine a first product, multiplying the first product by the reciprocal of pi to determine a second product, and taking the square root of the second product to determine the filament diameter.

25. The method of claim 22 further comprising a fiber selected from the group consisting of metal, glass, polymer, ceramics, minerals, including silica fibers, natural organic materials including wood, paper, cotton and cellulose, or combinations thereof.

26. A method of measuring the equivalent diameter of a filament produced by a filament-producing apparatus where the filament has a non-circular cross-section, the filament is substantially continuous, and a mass throughput, a density and a cross-sectional perimeter are known for the filament, comprising:

scanning the filament by:

providing a first laser beam and a second laser beam, aiming the first beam and the second beam at the filament stream causing the first beam and the second beam to intersect at a focal point on the filament stream to form a measuring volume wherein the filaments which pass through the measuring volume cause the scattering of light of the first beam and the second beam creating optical impulses, detecting the optical impulses with an optical receiving device, transmitting the optical impulse to a photodetector device wherein the optical impulses are converted into electrical impulses, and converting the electrical impulses into a filament velocity;

outputting the filament velocity;

manipulating the mass throughput, the density and the filament velocity to determine the cross-sectional area of the filament; and determining the filament equivalent diameter from the filament cross-sectional area and the filament cross-sectional perimeter.

27. The method of claim 26 wherein the step of manipulating the mass throughput, the density and the velocity further comprises:

dividing the mass throughput by the product of the density and the velocity.

28. The method of claim 26 wherein the step of determining the filament equivalent diameter from the filament cross-sectional area further comprises:

multiplying the cross-sectional area by 4 to determine a product and dividing the product by the cross-sectional perimeter.

29. The method of claim 26 further comprising a fiber selected from the group consisting of metal, glass, polymer, ceramics, minerals, including silica fibers, natural organic materials including wood, paper, cotton and cellulose, or combinations thereof.

30. A method of measuring the diameter of a filament having a substantially circular cross-section produced by a filament-producing apparatus where the filament is substantially continuous and the parameters of mass throughput and density are known, comprising:

scanning the filament by:

providing a first laser beam and a second laser beam, aiming the first beam and the second beam at the filament stream causing the first beam and the second beam to intersect at a focal point on the filament stream to form a measuring volume wherein the filaments which pass through the measuring volume cause the scattering of light of the first beam and the second beam creating optical impulses, detecting the optical impulses with an optical receiving device, transmitting the optical impulses to a photodetector device wherein the optical impulses are converted into electrical impulses, and converting the electrical impulses into a filament velocity;

outputting the filament velocity;

manipulating the mass throughput, the density and the velocity to determine the cross-sectional area of the filament; and determining the filament diameter from the filament cross-sectional area.

31. The method of claim 30 wherein the step of manipulating the mass throughput, the density and the velocity further comprises:

dividing the mass throughput by the product of the density and the velocity.

32. The method of claim 30 wherein the step of determining the filament diameter from the filament cross-sectional area further comprises:

multiplying the cross-sectional area by 4 to determine a first product, multiplying the first product by the reciprocal of pi to determine a second product, and taking the square root of the second product to determine the filament diameter.

33. The method of claim 30 further comprising a fiber selected from the group consisting of metal, glass, polymer, ceramics, minerals, including silica fibers, natural organic materials including wood, paper, cotton and cellulose, or combinations thereof.

34. A method for analyzing a fiber stream, comprising:

passing fibers from an orifice onto a mat disposed a distance from the orifice; and measuring automatically the mass flux of fibers at a location near the mat within a zone of random fiber orientation in the fiber stream wherein while measuring the mass flux the fiber stream flows continuously without interruption.

* * * * *

UNITED STATES PATENT AND TRADEMARK OFFICE
CERTIFICATE OF CORRECTION

PATENT NO. : 5,231,463
DATED : July 27, 1993
INVENTOR(S) : Robert L. Shambaugh

It is certified that error appears in the above-identified patent and that said Letters Patent is hereby corrected as shown below:

In the drawings, sheet 3 of 18, please insert --Figure 3--.

In the drawings, sheet 4 of 18, please insert --Figure 4--.

Column 17, Line 24, please delete "throughout" and substitute therefore --throughput--

Column 17, Line 61; after "determining the filament", please insert --diameter--.

Signed and Sealed this

Fifth Day of April, 1994

Attest:

Attesting Officer

BRUCE LEHMAN

Commissioner of Patents and Trademarks